(12) United States Patent
Krishna et al.

(10) Patent No.: US 11,790,777 B2
(45) Date of Patent: Oct. 17, 2023

(54) INTELLIGENT PREDICTIVE SIGN BOARDS FOR ROAD SAFETY

(71) Applicant: INTERNATIONAL BUSINESS MACHINES CORPORATION, Armonk, NY (US)

(72) Inventors: Hariharan Krishna, Bangalore (IN); Venkata Vara Prasad Karri, Visakhapatnam (IN); Akash U. Dhoot, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/654,961

(22) Filed: Mar. 15, 2022

(65) Prior Publication Data

US 2023/0298467 A1 Sep. 21, 2023

(51) Int. Cl.
*G08G 1/0967* (2006.01)
*G08G 1/01* (2006.01)
(Continued)

(52) U.S. Cl.
CPC ..... *G08G 1/096783* (2013.01); *G03H 1/0005* (2013.01); *G08G 1/017* (2013.01);
(Continued)

(58) Field of Classification Search
CPC ........ G06V 20/54; G06V 20/56; G06V 20/58; G08G 1/096783; G08G 1/0116;
(Continued)

(56) References Cited

U.S. PATENT DOCUMENTS 3,768,187 A * 10/1973 Dunne .................... G09F 7/002
40/613
4,284,971 A    8/1981 Lowry
(Continued)

FOREIGN PATENT DOCUMENTS

WO    2018086146 A1    5/2018
WO    2018178844 A1    10/2018

OTHER PUBLICATIONS

Mell et al., "The NIST Definition of Cloud Computing", National Institute of Standards and Technology, Special Publication 800-145, Sep. 2011, pp. 1-7.
(Continued)

*Primary Examiner* — Omeed Alizada
(74) *Attorney, Agent, or Firm* — Caleb D. Wilkes

(57) ABSTRACT

A method, computer system, and a computer program product for roadway messaging are provided. A computer receives first information of a reduction of a roadway section. The computer determines a passable road width at the reduction in the roadway section. The computer determines a size of a first vehicle. The computer determines whether the first vehicle fits through the passable road width. The computer generates a first message based on the determining of whether the first vehicle fits through the passable road width, the first message comprising a driving recommendation for the first vehicle. The computer transmits the first message for reception by the first vehicle.

19 Claims, 10 Drawing Sheets

(51) Int. Cl.
*G03H 1/00* (2006.01)
*G08G 1/017* (2006.01)
*G08G 1/056* (2006.01)
*G08G 1/16* (2006.01)

(52) U.S. Cl.
CPC ......... *G08G 1/0116* (2013.01); *G08G 1/0141* (2013.01); *G08G 1/0145* (2013.01); *G08G 1/056* (2013.01); *G08G 1/096725* (2013.01); *G08G 1/166* (2013.01)

(58) Field of Classification Search
CPC .... G08G 1/0141; G08G 1/0145; G08G 1/017; G08G 1/056; G08G 1/096725; G08G 1/166; G03H 1/0005
See application file for complete search history.

(56) References Cited

U.S. PATENT DOCUMENTS

| | | | | |
|---|---|---|---|---|
| 6,690,408 | B1* | 2/2004 | Abersfelder | G02B 5/32 |
| | | | | 348/40 |
| 8,854,462 | B2* | 10/2014 | Herbin | G08G 1/168 |
| | | | | 348/148 |
| 8,880,237 | B2 | 11/2014 | Boss | |
| 10,969,595 | B2 | 4/2021 | Uenohara | |
| 2012/0139756 | A1 | 6/2012 | Djurkovic | |
| 2016/0379485 | A1 | 12/2016 | Anastassov | |
| 2019/0108548 | A1 | 4/2019 | Gaither | |
| 2020/0249696 | A1* | 8/2020 | Watanabe | G05D 1/0291 |
| 2020/0279481 | A1* | 9/2020 | Kondo | G08G 1/0969 |
| 2020/0333745 | A1 | 10/2020 | Gale | |
| 2021/0382144 | A1 | 12/2021 | He | |
| 2022/0171069 | A1 | 6/2022 | Hamilton | |

OTHER PUBLICATIONS

Scaleout Software, "Digital Twins and Real-Time Digital Twins: What's the Difference?", blogpost on scaleoutsoftware.com, published Oct. 16, 2019, 6 pgs., accessed Mar. 4, 2022 from <https://www.scaleoutsoftware.com/featured/digital-twins-and-real-time-digital-twins-whats-the-difference/>.

Web Urbanist, "Liquid Stop Sign: Emergency Laser Projection on Sheet of Water", article on weburbanist.com, published on Nov. 5, 2015, 8 pgs., accessed on Mar. 2, 2022 from <https://weburbanist.com/2015/11/05/liquid-stop-sign-emergency-laser-projection-on-sheet-of-water/>.

Noppakaew et al., "Construction of multi-layered QR codes utilizing partitions of positive integers", Journal of Mathematics and Computer Science, 18 (2018), pp. 306-313, doi: 10.22436/jmcs.018.03.06.

Abbas, "5G Ultra-Reliable Low Latency Communication (URLLC)", 5G Hub, Accessed Mar. 28, 2023, https://5ghub.us/5g-ultra-reliable-low-latency-communication-urllc/, 4 pages.

Abdallah et al., "SafeOverPass: An Edge-Based Low-Clearance Overpass Warning System," IEEE, 2021 Fourth International Conference on Connected and Autonomous Driving (MetroCAD), conference Apr. 2021, added to IEEE Explore Aug. 2021, pp. 17-22.

Ahamed et al., "5G Network Coverage Planning and Analysis of the Deployment Challenges," Sensors, Published Online: Oct. 3, 2021, PMCID: PMC8512478, https://www.ncbi.nlm.nih.gov/pmc/articles/PMC8512478/, 31 pages.

Author Unknown "Computer vision system helps to prevent tall trucks from hitting bridges" University of Cambridge, Accessed: Jan. 6, 2023, https://www-smartinfrastructure.eng.cam.ac.uk/news-and-events/computer-vision-system-helps-to-prevent-tall-trucks-from-hitting-bridges, 3 pages.

Chacon et al., "A Moving Vehicle Height Monitoring Sensor System for Overheight Impact Avoidance," Infrastructures 2021, 6, 91, Published: Jun. 18, 2021, https://doi.org/10.3390/infrastructures6060091, 10 pages.

IBM: List of IBM Patents or Patent Applications Treated as Related. Filed Herewith. 2 pages.

Iyengar et al., "Determining Vehicle Height Using 5G NR Signals", Related U.S. Appl. No. 18/191,313, filed Mar. 28, 2023, 36 pages.

LF Edge, "Micro-Mec", Accessed Mar. 24, 2023, https://www.lfedge.org/projects/release-3/r3micro-mec/, 3 pages.

Penn State, "Image-Based Vehicle Height Measurement for Prevention of Low Clearance Infrastructure Collisions," Accessed: Jan. 6, 2023, https://r3utc.psu.edu/research/core-research-projects/image-based-vehicle-height-measurement/, 3 pages.

Pride Transport, "How Long Does It Take a Semi-Truck to Stop?", Jan. 13, 2022, https://www.pridetransport.com/news-and-events/how-long-does-it-take-a-semitruck-to-stop, 5 pages.

RF Wireless World, "5G vs 6G | Difference between 5G and 6G," Accessed: Mar. 24, 2023, https://www.rfwireless-world.com/Terminology/Difference-between-5G-and-6G.html, 9 pages.

Tapco, "Overheight Warning System," Tapconet.com, Accessed: Mar. 24, 2023, https://www.tapconet.com/product/overheight-warning-system, 7 pages.

Tokyo Institute of Technology, "Introducing a transceiver that can tap into the higher frequency bands of 5G networks" Tech Xplore, Jun. 15, 2022, https://techxplore.com/news/2022-06-transceiver-higher-frequency-bands-5g.html, 3 pages.

Tung, "Warning System for Over-Height Vehicles" electronicsforu,com, Jan. 15, 2019, https://www.electronicsforu.com/electronics-projects/vehicle-detection-system, 4 pages.

* cited by examiner

INTELLIGENT PREDICTIVE SIGN BOARDS FOR ROAD SAFETY

BACKGROUND

The present invention relates generally to a system and method for providing messages to vehicles traveling along a roadway and which gathers information from a variety of sources in order to generate and provide an individualized message to a vehicle.

SUMMARY

According to one exemplary embodiment, a method for roadway messaging is provided. A computer receives first information of a reduction of a roadway section. The computer determines a passable road width at the reduction in the roadway section. The computer determines a size of a first vehicle. The computer determines whether the first vehicle fits through the passable road width. The computer generates a first message based on the determining of whether the first vehicle fits through the passable road width, the first message comprising a driving recommendation for the first vehicle. The computer transmits the first message for reception by the first vehicle.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, computer program product, and roadway messaging system for dynamically providing messages to vehicles traveling on roadways that help the vehicles and their drivers make safety-based decisions and/or navigation enhancing decisions. The present embodiments help improve sign boards which often are implemented as accident zone boards. The present embodiments may include the implementation of machine learning models which include one or more algorithms, and which calculate accident possibilities and generate an appropriate individualized message for incoming traffic based on the calculated accident possibility. The individualized message may be presented as or along with colored fonts, color changes, and/or color coding to better show the accident possibility and to better capture the attention of those in an oncoming vehicle. The present embodiments may help enhance road safety for roads and highways across the world and may help integrate technological advances into roadside message systems to help riders and drivers have a safer driving experience. The present embodiments may intelligently incorporate variables, e.g., information, such as driving patterns, past driving experience, vehicle sizes, and many external attributes with respect to a vehicle. The present embodiments may implement the display of messages that will inform drivers of valuable information which can help them make an improved safety decision for driving, especially when a road interference has caused a reduction in the passable road width for an oncoming vehicle.

Figure 1:
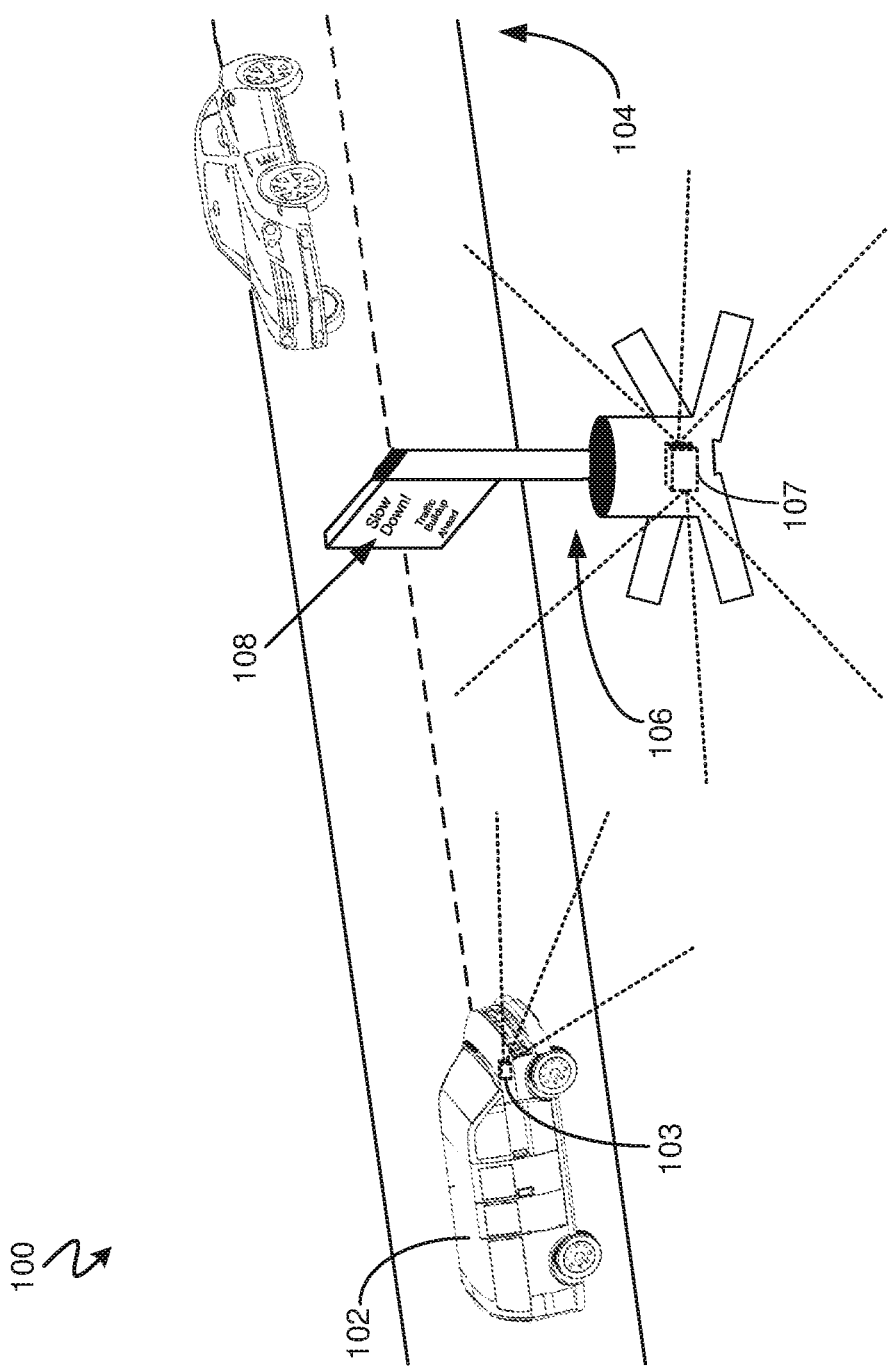
FIG. 1 illustrates a roadway messaging environment and system according to at least one embodiment.

Referring to FIG. 1, a roadway messaging environment 100 in accordance with an exemplary embodiment is depicted. The roadway messaging environment 100 may include a roadway section 104 and one or more vehicles such as the first vehicle 102 traveling along or approaching the roadway section 104. FIG. 1 shows an example with a two lane road that helps constitute the roadway section 104. Other roadway messaging environments according to other embodiments may be implemented with roads having more or less lanes than the two that are shown in FIG. 1. The first vehicle 102 may include a vehicle messaging computer 103 that participates in the roadway messaging environment 100 and that may communicate with computers that are externally located with respect to the first vehicle 102. The vehicle messaging computer 103 may communicate with other computers such as the sign board messaging computer 107 that is part of the intelligent sign board 106. The sign board messaging computer 107 may receive information from other computers such as those in approaching vehicles, those in the vicinity with sensors, those from other intelligent sign boards within a transmission distance, and others in the cloud. The vehicle messaging computer 103 may communicate with the sign board messaging computer 107 as soon as the first vehicle 102 enters a proximity range for message transmission for the sign board messaging computer 107. Various weather and signal strength factors may affect the magnitude of the proximity range. The sign board messaging computer 107 may continue to receive updates from the vehicle messaging computer 103 consistently and/or continuously as the first vehicle stays within the proximity range of transmission of the sign board messaging computer 107, of the vehicle messaging computer 103, and/or of a combination of the sign board messaging computer 107 and the vehicle messaging computer 103. The roadway messaging environment 100 may include one or more drones with respective computers and sensors which may capture and/or sense information and share the information with the sign board messaging computer 107 and with other computers such as those in the cloud.

The sign board messaging computer 107 may use this information to generate an individualized safety message and may display the individualized message on a display screen of the intelligent sign board 106. FIG. 1 shows that an individualized roadway message 108 is being displayed on the display screen of the intelligent sign board 106. The individualized roadway message 108 being displayed in FIG. 1 is individualized for the first vehicle 102, is intended for viewing by the first vehicle 102, and in this instance includes the words: "Slow Down! Traffic Buildup Ahead".

The sign board messaging computer 107 may have received and/or determined a speed of the first vehicle 102 as the first vehicle 102 approaches the roadway section 104. The sign board messaging computer 107 may have received information from other computers and/or sensors in and/or near the roadway section 104 which indicated that many vehicles were in the area so that vehicular speeds were substantially reduced. The sign board messaging computer 107 may use the speed and the additional information regarding the traffic buildup to determine that the first vehicle 102 may have a safety risk of colliding with one or more of the vehicles in the traffic buildup unless the first vehicle 102 reduces its speed quickly. Other intelligent sign boards, roadside computers, other vehicle messaging computers, and other computers may provide information that the sign board messaging computer 107 may use to generate an individualized message, e.g., a safety message, to display for an oncoming/approaching vehicle.

FIG. 1 shows the individualized safety message 108 being displayed on a display screen of the intelligent sign board 106. In other embodiments, the sign board messaging computer 107 may transmit a safety message to the vehicle messaging computer 103 in a manner which causes an in-vehicle display to display the individualized safety message. Such an in-vehicle display may occur as an alternative or an addition to the display of the individualized safety message on the display screen of the intelligent sign board 106. Such an in-vehicle display may occur on a navigational screen in the dashboard of the vehicle or may be displayed directly on the glass of the front windshield of the vehicle. The navigational screen may incorporate global positioning system-based navigation and may include functionality of an automated voice assistant and an automated alert manager.

The message may be displayed in the first vehicle 102 via a projector in the first vehicle 102 which displays the message on windshield glass of the first vehicle 102 in a field of view of a vehicle occupant who may be the driver or a passenger of the first vehicle 102. The roadway messaging system may incorporate edge computation to process data variations to generate the message. The first vehicle 102 may include one or more lasers that reflect laser light off of a mirror and onto the windshield. The first vehicle 102 may additionally and/or alternatively include a windshield with a self-luminous intermediate layer between internal and external layers of glass. The self-luminous intermediate layer may become irradiated with laser light and be visible at all angles to occupants within the first vehicle 102 and the laser light causes images/characters to appear. For example, a passenger in the back seat of the first vehicle 102 may see the characters/images displayed, e.g., in an iridescent manner, on the front windshield of the first vehicle 102. In other example embodiments, the first vehicle 102 may include an array of projectors located in the dash of the first vehicle 102 that augment, or overlay, information so that the message/information appears to a driver or other occupants of the first vehicle 102 as seamlessly interwoven with the physical world. This interweaving may allow the message to be perceived as an immersive aspect of the real environment. The first vehicle 102 may include internal and external hardware components to achieve this in-vehicle windshield display of the message, e.g., of the safety message. The first vehicle 102 may include a retractable screen which may extend above the dash and reflect light from a projector to display the message. The retractable screen may retract into the dashboard when being unused. The first vehicle 102 may include one or more cameras which capture information from the surroundings of the first vehicle 102. A computer of the first vehicle 102 may use the picture/video captured from these cameras to ensure that the safety message is displayed on the vehicle window in a position that does not obscure the view of exterior objects that are important for a driver of the first vehicle 102 to see.

An in-vehicle display of the safety message may also occur on a personal computer device of the occupants of the vehicle, e.g., of a personal cell phone which is being used for navigational purposes. Such a personal computer may be placed in a holder that is attached to the vehicle, e.g., is attached to the rear windshield mirror or to the dash of the vehicle.

The vehicles such as the first vehicle 102 may be driven by humans and/or may be autonomous vehicles. The vehicles such as the first vehicle 102 may include human drivers and/or passengers. Autonomous vehicles that are being driven by computer controls may include humans as passengers in the vehicle and/or may include goods within the vehicle.

Figure 4:
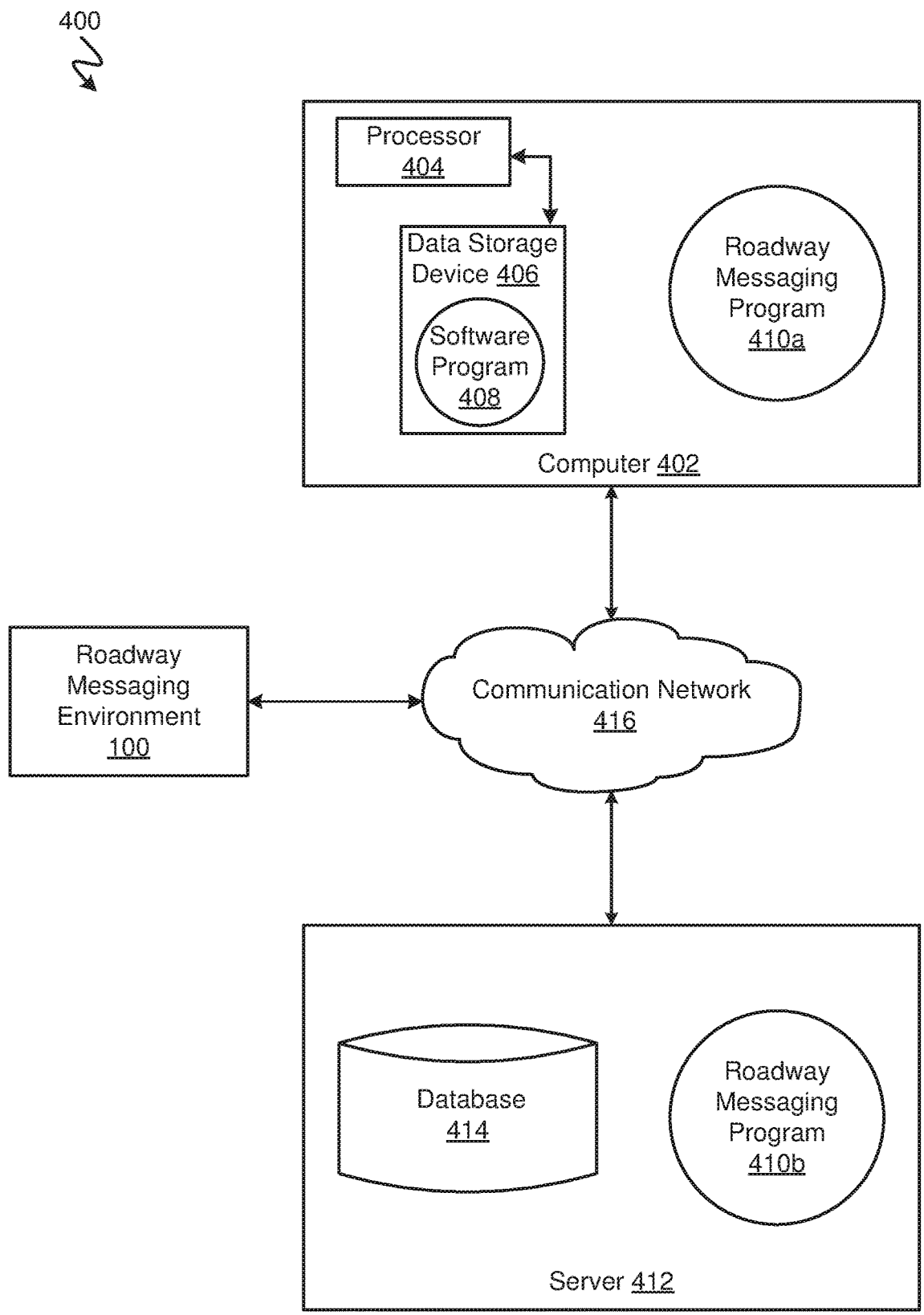
FIG. 4 illustrates a networked computer environment according to at least one embodiment.

In the example shown in FIG. 1, the sign board messaging computer 107 may collect information about the roadway environment. The sign board messaging computer 107 may have or communicate with one or more sensors and databases which provide useful information about the roadway conditions and design of the roadway. The sign board messaging computer 107 may receive this useful information via a message transmission that occurs via a communication network such as the communication network 416 that is shown in FIG. 4 and will be described subsequently.

The useful information may include variables such as the number of alerts that have been issued recently or over a specified time span regarding this section of roadway, a number of accidents that have recently and/or historically occurred in this section of roadway, and recent past, current, and forecasted weather analysis for the area of this section of roadway. The useful information may additionally and/or alternatively include variables such as a history of a driver who is driving an approaching vehicle such as the first vehicle 102, a speed history for various vehicles that have passed between signboards in this section of roadway, and a current speed analysis for vehicles that are currently passing between the sign board messaging computer 107 and the next roadside computer along the road, e.g., along the roadway section 104. Drivers who would like to have their driving history be tracked by the messaging system in order to receive enhanced personalized safety recommendations and messages may provide consent and authorization for such tracking via, before the drive starts, accessing a web portal for the roadway messaging program and providing the consent. The useful information may also include an analysis of other vehicles in the area including size, speed, and driving pattern analysis. The useful information may also include a driver analysis, e.g., a retina analysis, of the driver of a particular oncoming vehicle and of other drivers who are driving other vehicles in the area. This retina analysis may indicate whether the driver is focused, is drowsy, etc.

Thus, the sign board messaging computer 107 may receive the useful information via data transmissions with computers in vehicles in the area, from other roadside computers, from databases in the cloud such as driver databases and weather databases, and websites such as traffic viewing websites and weather tracking/forecasting websites.

Based on the variables and information that are received by the sign board messaging computer 107, an individualized message may be generated for each oncoming vehicle that has entered or is approaching this particular roadway section. The sign board messaging computer 107 may include an analytics engine which may include one or more machine learning models which may receive various inputs such as those described above for the useful information and which may, in response to receiving the various inputs, output a driving strategy/recommendation for an oncoming vehicle.

The driving strategy and/or recommendation that is generated by the analytics engine of the sign board messaging computer 107 may be transmitted in a message transmission from the sign board messaging computer 107 to a display screen of the intelligent sign board 106 in order to enable and instruct the display screen to display the individualized roadway message 108.

In instances when an approaching vehicle is an autonomous vehicle, the sign board messaging computer 107 may generate and transmit a message to the autonomous vehicle that is an instruction message. The instruction message may, when received by the autonomous vehicle, cause the autonomous vehicle to automatically implement the driving strategy recommendation that was generated by the sign board messaging computer 107. When the roadway messaging system includes multiple roadside computers, the system as a whole may consistently receive updates from and monitor the first vehicle 102 as it stays within transmission proximity range of at least one of the roadside computers connected to the roadway messaging system.

Figure 2A:
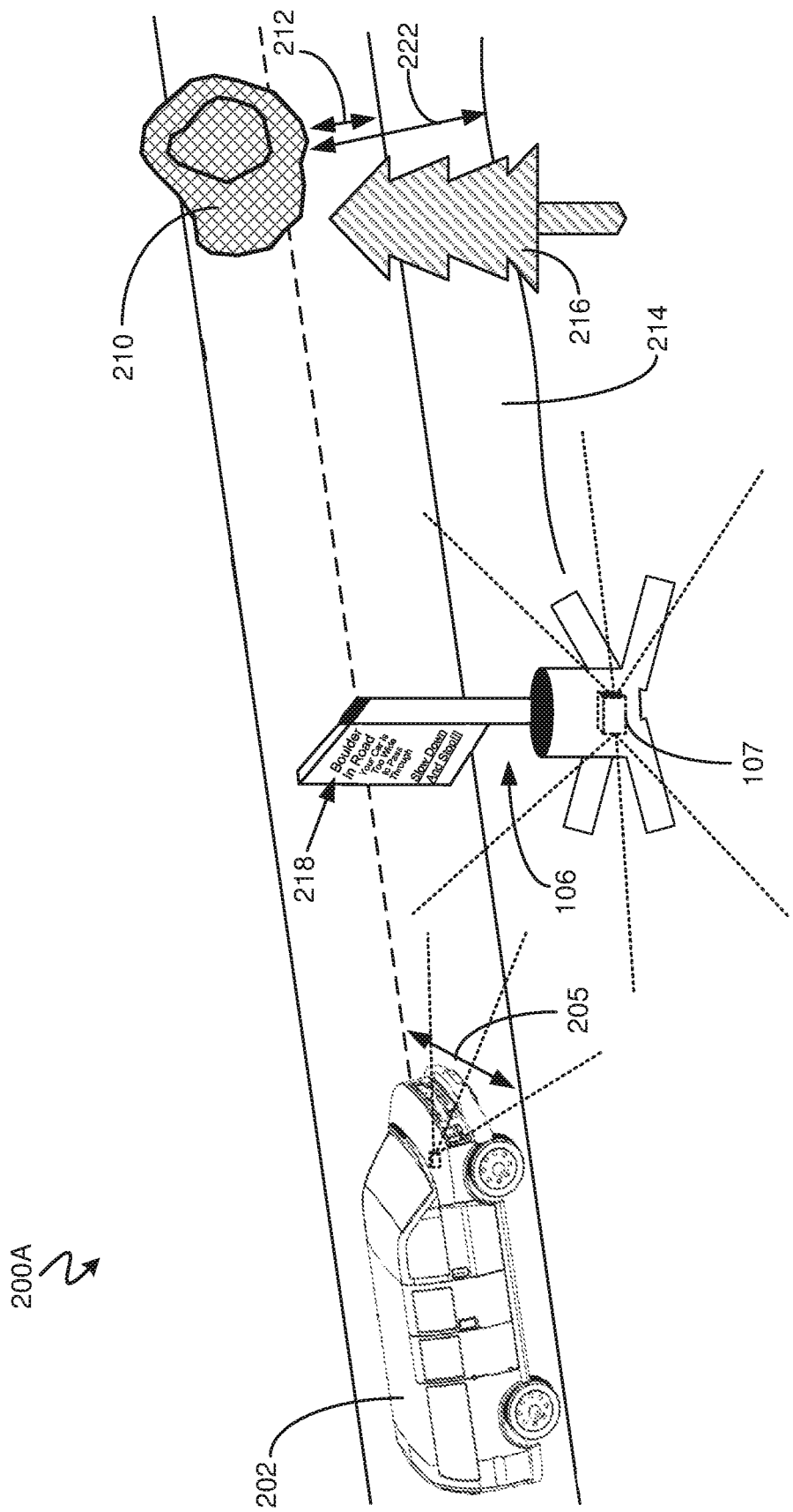
FIG. 2A illustrates a roadway messaging system in a blocked road situation with a first vehicle according to at least one embodiment.

FIG. 2A shows a specific implementation of a roadway messaging system in a traffic interference situation 200A. Specifically, in the traffic interference situation 200A shown in FIG. 2A a road blockage has occurred in a manner such that a reduction of the usable road has occurred. The roadway messaging system may identify the road blockage and then based on that first information may provide an appropriate individualized warning message to an oncoming vehicle. FIG. 2A shows that a wide vehicle 202 is approaching a roadway section with an on-road boulder 210. Specifically, a boulder has fallen off of a mountainside onto one of the lanes of the traffic and has become an on-road boulder 210. The on-road boulder 210 fully blocks one lane of traffic and partially blocks the opposite lane of traffic. Due to the partial block by the on-road boulder 210 of one of the lanes of traffic, the roadway section has a passable road width 212 that is smaller than the usual lane width. The roadway messaging system may identify this passable road width 212 and appropriately warn oncoming vehicles. In FIG. 2A, the road portion with the passable road width 212 covers space of only areas of the original lanes of the road and not any portion of a road shoulder 214 that is disposed laterally adjacent to the lanes of the roadway section.

Figure 2B:
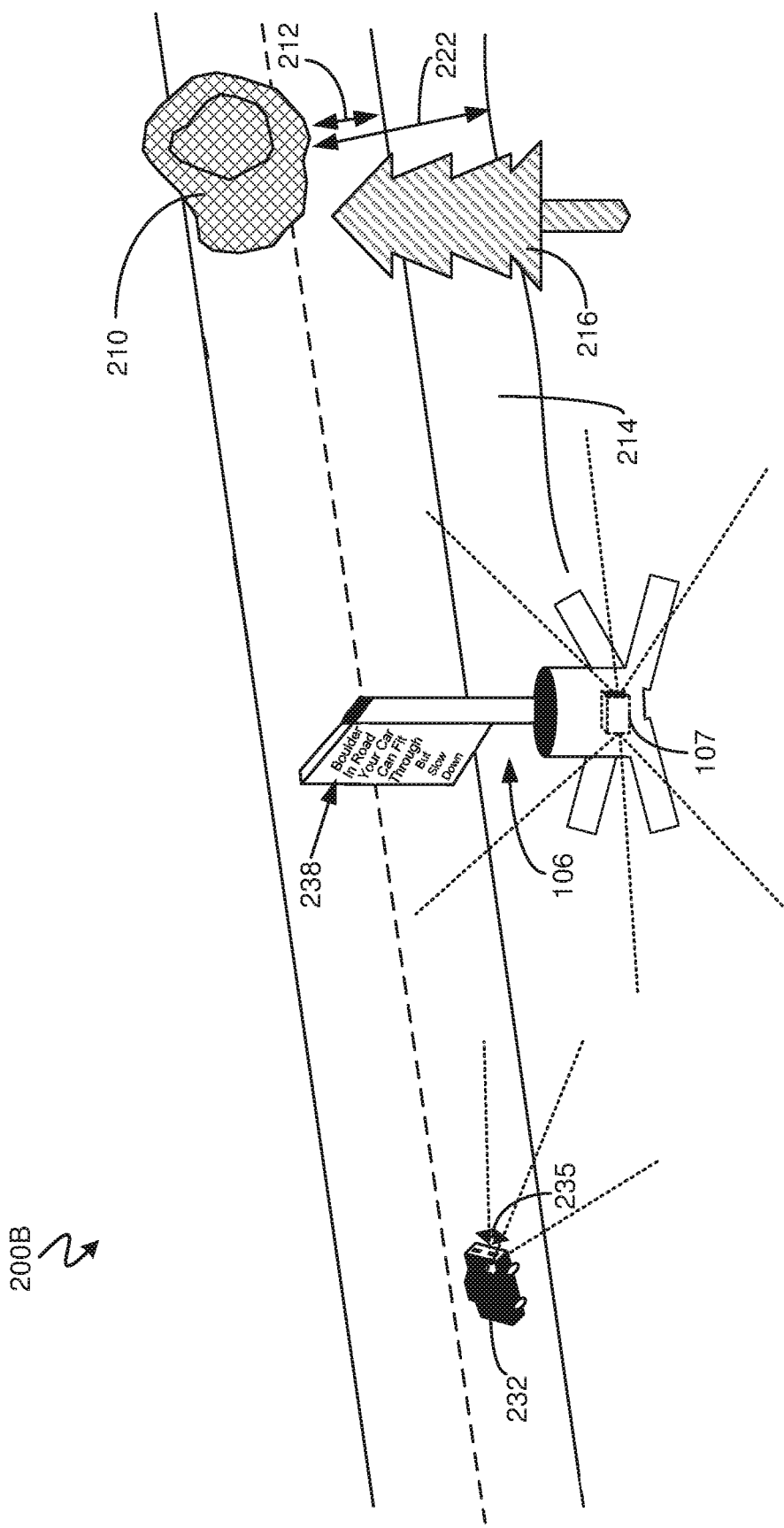
FIG. 2B illustrates a roadway messaging environment in the blocked road situation with another vehicle according to at least one embodiment.

Although FIGS. 2A and 2B show a natural object of a boulder having caused the reduction of the passable road width 212, in other instances other objects may alternatively cause a reduction of the amount/size of road that can be passed. Such other objects may be another object of nature such as a fallen tree, an animal carcass, pooled water from heavy rain or a flood, another vehicle that has stopped, e.g., when an accident has occurred, a fence or other human-made object being blown onto or dropped on the road, and a loss of pavement, e.g., due to a flood washing away part of a road, a sinkhole emerging under the roadway, a huge pothole developing in the pavement, etc. Visual information, noise information, and/or tremor information may be first information that is received to indicate any of these possible road blockages.

The sign board messaging computer 107 of the intelligent sign board 106 may also receive and/or sense information from the wide vehicle 202 that is approaching and may, specifically, receive and/or sense a wide vehicle width 205 of the wide vehicle 202. The messaging computer of the wide vehicle 202 may transmit this information. The intelligent sign board 106 may include one or more sensors such as a camera that may be able to sense and measure this width. The intelligent sign board 106 may also communicate with another sensor or computer in the cloud and/or in the vicinity to receive this information about the width of the vehicle. In some embodiments, the sign board messaging computer 107 may determine a model and make of the approaching vehicle and may use the make and model to look up the vehicle width for the make and model from a local or cloud-based vehicle information database.

Similarly, the sign board messaging computer 107 of the intelligent sign board 106 may receive and/or sense information from the roadway section and/or from one or more other computers that the on-road boulder 210 is on the roadway section and is blocking some or all of one or more the traffic lanes of the road. The intelligent sign board 106 may include one or more sensors such as a camera that may be able to sense and measure the presence and size of the on-road boulder 210 and of the passable road width 212. The sign board messaging computer 107 may communicate with one or more drones in the vicinity which include a respective camera which captures video footage of the road. The video footage may be fed into a machine learning model of the sign board messaging computer 107. Thus, the intelligent sign board 106 may be able to gain and/or sense information from either direction along the roadway compared to its own position near the roadway. The intelligent sign board 106 may also communicate with another sensor or computer in the cloud and/or in the vicinity to receive this information about the presence and size of the on-road boulder 210 and of the passable road width 212.

After having the wide vehicle width 205 to compare to the passable road width 212, the sign board messaging computer 107 may determine that the wide vehicle width 205 is larger than the passable road width 212 and that the wide vehicle 202 will not be able to successfully pass through the roadway section. On that basis, the sign board messaging computer 107 may generate an individualized stopping recommendation 218 for the wide vehicle 202 and may display this individualized stopping recommendation 218 for viewing by occupants of the wide vehicle 202 and/or for instruction of the wide vehicle 202. FIG. 2A shows the individualized stopping recommendation 218 as a message "Boulder in Road—Your Car Is Too Wide to Pass Through—Slow Down and Stop!!" being displayed on a display, e.g., a screen, of the intelligent sign board 106. By seeing this individualized stopping recommendation 218 displayed, the driver of the wide vehicle 202 may know to slow down and stop the wide vehicle before hitting the on-road boulder 210.

As was described above for the description of the roadway messaging environment 100 shown in FIG. 1, the individualized stopping recommendation 218 may also be displayed by transmitting a message to a computer of the wide vehicle 202 which causes an in-vehicle display of the wide vehicle 202 to display the individualized stopping recommendation 218 as a message. Such in-vehicle display may occur on a personal cell device of an occupant of the wide vehicle 202, on a navigational display of the wide vehicle 202, and/or on a front windshield in a field of view of a driver of the wide vehicle 202.

In an embodiment in which the wide vehicle 202 is an autonomous vehicle, an instruction message may be transmitted from the sign board messaging computer 106 to a computer of the wide vehicle 202 with the individualized stopping recommendation 218. This instruction message may force a control computer of the autonomous vehicle to follow the individualized stopping recommendation 218 and slow down and stop the wide vehicle 202 before the wide vehicle reaches the roadway section with the reduced width, e.g., with the passable road width 212. The control computer may control an operation of the autonomous vehicle such as the engine, brakes, and steering of the autonomous vehicle. This embodiment with an instruction message imposing a driving strategy modification on the autonomous vehicle may be performed as an alternative to or in conjunction with the presenting of the individualized stopping recommendation 218 for receiving, e.g., viewing, by any occupants of the autonomous vehicle.

The roadway messaging system which includes the sign board messaging computer 106 may receive one or more messages from a road cleanup agency that may be a government agency such as a transportation agency and/or a law enforcement agency. These messages may provide information about cleanup and/or removal efforts and time estimates until the traffic block conditions will be resolved. The sign board messaging computer 106 may cause these wait estimated and condition resolution updates to be displayed in the same manner that other messages are displayed as described above.

FIG. 2B shows a specific implementation of a roadway messaging system in another traffic interference situation 200B. This other traffic interference situation 200B has the same cause of interference as in the embodiment shown in FIG. 2A, namely has the on-road boulder 210 fully blocking one of the lanes of the roadway section and partially blocking a second lane of the roadway section. In FIG. 2B a narrow vehicle 232 is approaching the roadway section and particularly the on-road boulder 210. The sign board messaging computer 107 may sense and/or receive a measurement of a width of the narrow vehicle 232, namely a narrow vehicle width 235. Receiving and/or sensing this narrow vehicle width 235 may be done in one or more of the same ways described above in which the wide vehicle width 205 of the wide vehicle 202 was received. The narrow vehicle 232 like the wide vehicle 202 and the first vehicle 102 may include a vehicle messaging computer which communicates with the sign board messaging computer 107.

Because the on-road boulder 210 has not moved, the passable road width 212 may be the same distance as it was when the wide vehicle 202 approached as was shown in FIG. 2A.

After having the narrow vehicle width 235 to compare to the passable road width 212, the sign board messaging computer 107 may determine that the narrow vehicle width 235 is smaller than the passable road width 212 and that the narrow vehicle 232 will be able to successfully pass through the reduction in the roadway section. On that basis, the sign board messaging computer 107 may generate an individualized passing recommendation 238 for the narrow vehicle 232 and may display this individualized passing recommendation 238 for viewing by occupants of the narrow vehicle 232 and/or for instruction of the narrow vehicle 232. FIG. 2B shows the individualized passing recommendation 238 as a message "Boulder in Road—Your Car Can Fit Through—But Slow Down!" being displayed on a display, e.g., a screen, of the intelligent sign board 106. By seeing this individualized passing recommendation 238 displayed, the driver of the narrow vehicle 232 may know to slow down but to proceed in driving to pass by the on-road boulder 210 through the remaining open lane portion in the roadway section.

As described above for the individualized stopping recommendation 218 in the FIG. 2A situation, the individualized passing recommendation 238 may also be displayed by transmitting a message to a computer of the narrow vehicle 232 which causes an in-vehicle presentation of the individualized passing recommendation 238 within the narrow vehicle 232. Such in-vehicle display may occur on a personal cell device of an occupant of the narrow vehicle 232, on a navigational display of the narrow vehicle 232, and/or on a front windshield in a field of view of a driver of the narrow vehicle 232.

In an embodiment in which the narrow vehicle 232 is an autonomous vehicle, an instruction message with the individualized passing recommendation 238 may be transmitted from the sign board messaging computer 106 to a computer of the narrow vehicle 232. This instruction message may force a control computer of the autonomous vehicle to implement the individualized passing recommendation 238 to slow down but not stop the narrow vehicle 232.

FIGS. 2A and 2B also both show a road shoulder 214 that is laterally adjacent to the roadway section. In an alternative embodiment, the roadway messaging program instance on the sign board messaging computer 107 may calculate passability of a traffic blockage situation by also taking into account size and passability of the road shoulder 214 and ability of an oncoming vehicle to drive on the road shoulder 214 safely and successfully. Using a sensor or communicating with another sensor, the roadway messaging program instance on the sign board messaging computer 107 may determine a slope of the road shoulder and confirm a lack of off-road obstacles within the shoulder. FIGS. 2A and 2B show a tree 216 as an example of the off-road obstacle. Typically, a road shoulder 214 is free of such off-road obstacles such as a tree 216 which may block and/or interfere with safe passage of a vehicle attempting to travel therethrough. The presence of such a such an off-road obstacle such as the tree 216, a fence, a wall, a stream, a steeply sloped stretch of land, etc. may help delineate the ending of a road shoulder 214 that would be considered passable. An ending of pavement may additionally and/or alternatively delineate an ending of the road shoulder 214. The quality of the road shoulder, e.g., the presence or lack of pavement, the presence or lack of any small obstacles, and the flatness of the road shoulder 214 may be determined and/or sensed via the road sign messaging computer 107 and used to determine the quality. A high degree of flatness of the road shoulder 214 may be interpreted by the road sign messaging computer 107 as weighing in favor of usability for the road shoulder 214.

In this alternative embodiment in which the road shoulder 214 is used to help calculate passability of a traffic blockage situation, the roadway messaging program instance on the sign board messaging computer 107 may calculate that the wide vehicle 202 may safely pass by the on-road boulder 210 by driving on or partially on the road shoulder 214. The roadway messaging program instance on the sign board messaging computer 107 may sense or receive a message about the tire condition and the ground clearance of the oncoming vehicle, e.g., the wide vehicle 202, and may use this input as part of the determination of whether the wide vehicle 202 may safely use the road shoulder 214 to pass the traffic blockage situation. These features/variables may help the roadway messaging program instance determine the drivability of a particular vehicle on the road shoulder 214. Using the size of the road shoulder 214 and the size of the passable road width 212 together, the roadway messaging program instance on the sign board messaging computer 107 may determine an extended passable road width 222.

The roadway messaging program instance on the sign board messaging computer 107 may compare the wide vehicle width 205 to the extended passable road width 222 to make a passability determination. The roadway messaging program instance on the sign board messaging computer 107 may generate a passability message to the oncoming vehicle, e.g., the wide vehicle 202, which instructs and/or recommends the oncoming vehicle to slow down and/or stop. For the wide vehicle 202 shown in FIG. 2A, in the alternative embodiment the wide vehicle 202 may be determined by the sign board messaging computer 107 to have tires in good condition, to have a ground clearance above a pre-determined threshold or a threshold calculated based on the height of any obstacles on the road shoulder, and to have its wide vehicle width 205 be smaller than the extended passable road width 222. The sign board messaging computer 107 may generate a message to the wide vehicle 202 which instructs/recommends to the wide vehicle 202 to slow down and to use the road shoulder 214 to pass the on-road boulder 210. Such usage of the extended passable road width 222 may be unnecessary in instances where a vehicle may safely pass through while staying on the road, such as may occur in the FIG. 2B situation with the narrow vehicle 232. Thus, with this alternative embodiment a wider vehicle may be cleared as safe to pass if part of the space of the original lanes of the roadway are used in conjunction with the space of the road shoulder 214 for the particular vehicle to drive around the blockage, e.g., the on-road boulder 210.

Figure 3A:
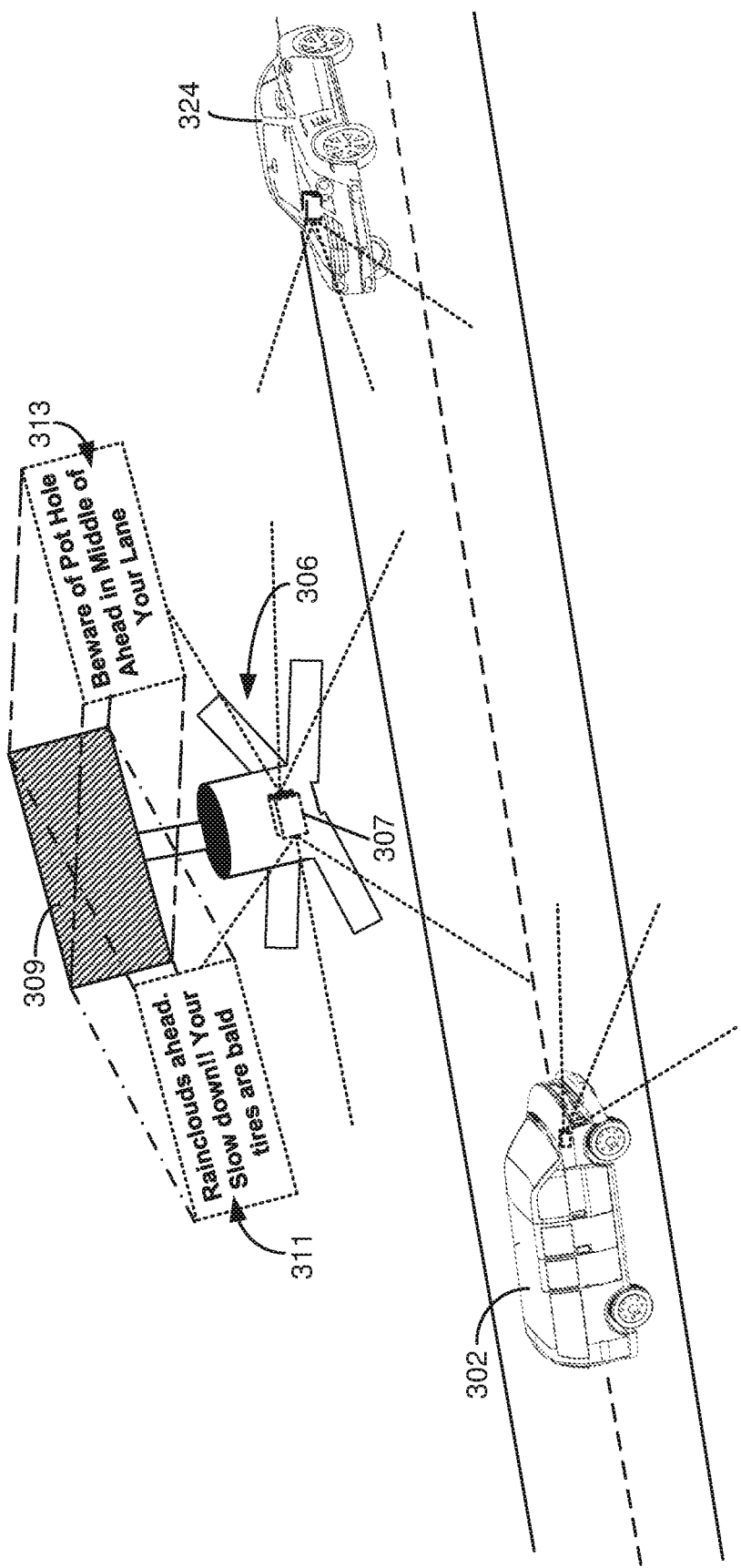
FIG. 3A illustrates a roadway messaging environment with a meshed messaging sign according to at least one embodiment.

FIG. 3A illustrates another roadway messaging environment according to at least one embodiment with a meshed messaging sign. FIG. 3A shows that a bi-directional intelligent sign board 306 displays, on the same bi-directional message screen 309, a first directional message 311 that is visible in a first direction and a second directional message 313 that is visible in a second direction that is opposite to the first direction. Thus, using the bi-directional message screen 309 the bi-directional intelligent sign board 306 may show a personalized message for a first direction traveling vehicle 302 that is traveling in the first direction and also simultaneously show another personalized message for a second direction traveling vehicle 324 that is traveling in the second direction that is opposite to the first direction. The bi-directional intelligent sign board 306 includes a bi-directional messaging computer 307 which receives and processes messages with roadway and vehicle information largely in the same manner in which the sign board messaging computer 107 does so as was described for the earlier embodiments. The bi-directional messaging computer 307 may, however, generate the multiple personalized messages which the bi-directional message screen 309 may use to simultaneously display to vehicles traveling in the opposite directions.

FIG. 3A shows that the first directional message 311 that is personalized for the first direction traveling vehicle 302 is "Rainclouds ahead. Slow Down! Your tires are bald." The bi-directional messaging computer 307 gathered and received information from the first direction traveling vehicle 302 about a tire quality of the tires being used by the first direction traveling vehicle 302. The bi-directional messaging computer 307 also gathered and received information about the weather condition of the roadway section ahead. The bi-directional messaging computer 307 then weighed and used this information as well as other information to generate the first directional message 311 as a personalized safety message for the first direction traveling vehicle 302. The roadway messaging program on the bi-directional messaging computer 307 may determine a priority score of safety warnings and may choose to generate a safety message which has the highest priority score. In this situation, roadway messaging program on the bi-directional messaging computer 307 may determine that the weather condition in combination with vehicle tire condition outweighed any safety issues sensed about a road condition of the upcoming roadway section.

FIG. 3A shows that the second directional message 313 that is personalized for the second direction traveling vehicle 324 is "Beware of Pothole Ahead in Middle of Your Lane." The bi-directional messaging computer 307 gathered and received information about the road condition of the roadway section ahead for the roadway portion that is ahead of the second direction traveling vehicle 324 in the second direction (namely from right-to-left in the viewpoint shown in FIG. 3). The bi-directional messaging computer 307 then weighed and used this information as well as other information to generate the second directional message 313 as a personalized safety message for the second direction traveling vehicle 324. In this situation, roadway messaging program on the bi-directional messaging computer 307 may determine that the road condition of the upcoming roadway section outweighed any weather condition for imminent weather for the upcoming roadway section as being relevant for a safety message for the second direction traveling vehicle 324.

The bi-directional intelligent sign board 306 may in at least some embodiments use holography to generate the simultaneously-displayed multiple messages so that the first message is visible in the first message and not in the second direction and the second message is visible in the second direction and not in the first direction. These multiple holographic views may present correct contextual real-time individualized messages to driving vehicles driving the opposite direction with a single display screen.

The bi-directional intelligent message screen 309 may in at least some embodiments include an image layer that is interlaced with two images. A first image of the two interlaced images of the image layer may be viewable from a first angle and may constitute the first directional message 311. A second image of the two interlaced images of the image layer may be viewable from a second angle that is different from the first angle and may constitute the second directional message 313. The bi-directional intelligent message screen 309 may also include a lens layer such as a lenticular lens layer. The lens layer may be disposed on the image layer, i.e., when the bi-directional intelligent sign board 306 is upright the lens layer may be disposed laterally adjacent the image layer and in-between the image layer and the exterior of the bi-directional intelligent sign board 306. The bi-directional messaging computer 307 may control composition of the image layer so as to continually update the image layer to have personalized interlaced messages for vehicles that are approaching from opposite directions.

In one embodiment, a meshed message intelligent road sign may be configured to provide multiple individualized messages to different vehicles approaching from the same direction, with each individualized message hidden from view from the various vehicles unless an access code is provided by the vehicle. A messaging computer of this road sign may transmit an access code to an approaching vehicle which is received by a messaging computer of the vehicle. The approaching vehicle then provides and/or uses this access code to see an individualized message which is meshed with other individualized messages within a multi-message display screen. In this embodiment, each approaching vehicle is required to provide their access code in order to see their individualized message that is displayed on the screen. For example, the intelligent sign board may mesh together four individualized messages intended for four separate vehicles which each approach the intelligent sign board from the same direction. Four separate access codes are provided to those vehicles and the viewing access to a particular access code is created when the access code that corresponds to that message is provided by the vehicle.

Such an embodiment of meshed messages may in at least some embodiments be implemented with multi-layer quick response (ML QR) codes. A quick response (QR) code is a matrix barcode and is a two-dimensional barcode. A QR code may include black squares of various sizes arranged in a square grid on a white background. The code may be read by an imaging device such as a camera, and processed using Reed-Solomon error correction until the image can be appropriately interpreted. The placement of the squares creates patterns in both the horizontal and vertical components of the image. From these patterns, data such as a locator, identifier, and/or tracker that points to a website or application may be extracted. A QR code may use four standardized encoding modes (numeric, alphanumeric, byte/binary, and kanji) to store data efficiently and may use extensions.

A multi-layer QR code may mesh multiple such individual QR codes together into one image. The individual layers of this multi-layer QR code may include squares with distinct colors. These colored squares may use some of the unused white space. For example, a first layer may include a first QR code formed from patterns of black squares and some white background. A second layer may include a second QR code formed from patterns of red squares intermingled with the black squares from the first layer. A third layer may include a third QR code formed from patterns of green squares intermingled with the red squares and the black squares. A fourth layer may include a fourth QR code formed from patterns of blue squares intermingled with the green, red, and black squares.

A viewing camera which sees the image of the ML QR code may with its computer be able to distinguish between the meshed individual QR codes and find multiple data sets/messages for the multiple codes, respectively. If for one entity a single QR code of a ML QR code is relevant and the other codes are irrelevant, if the entity knows which layer to choose then the computer of that entity may select that code/data and ignore the rest.

Thus, for using such a meshed message when multiple vehicles are approaching, if a particular approaching vehicle knows which individual QR code to extract then the vehicle may receive a personalized message by using that individual QR code. Multiple other vehicles may simultaneously extract their own message by knowing which of the individual QR codes to extract from the ML QR code.

Figure 3B:
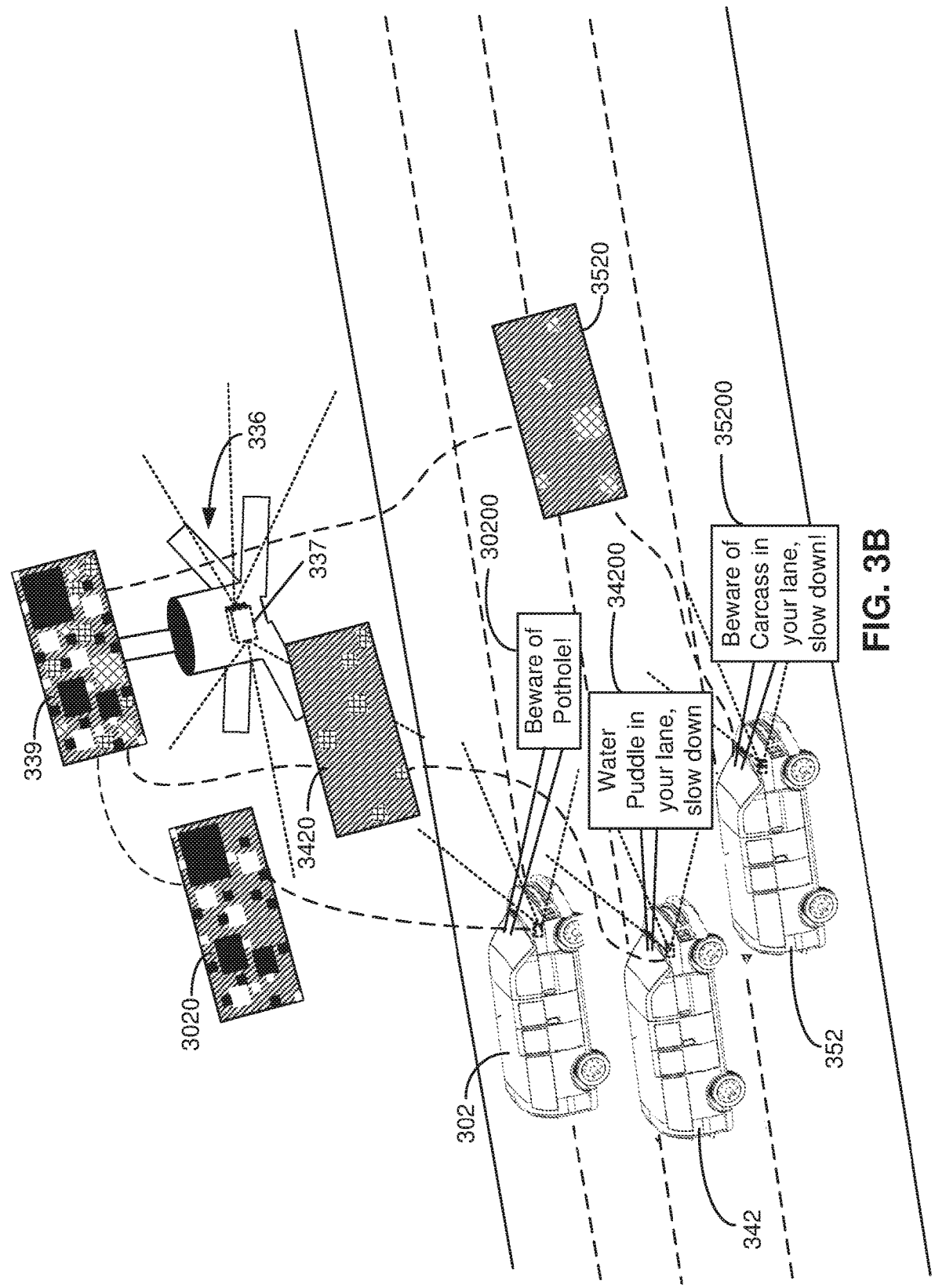
FIG. 3B illustrates a roadway messaging environment with another embodiment of a meshed messaging sign.

FIG. 3B illustrates a roadway messaging environment with an example of this meshed messaging sign with an ML QR code. FIG. 3B shows that a multi-layer QR intelligent sign board 336 displays a multi-layer QR code on its multi-layer QR screen 339. The multi-layer QR code includes, in this example, the meshing of three individual QR codes, namely a first layer QR code 3020, a second layer QR code 3420, and a third layer QR code 3520. These three QR codes are simultaneously displayed together in a meshed manner on the multi-layer QR screen 339. The multi-layer QR intelligent sign board 336 may include a multi-layer QR messaging computer 337 which is equivalent to the bi-directional messaging computer 307 with its ability to receive messages and information and use that input to generate an individualized safety message for an oncoming vehicle. The multi-layer QR messaging computer 337 generates the pattern of squares and colors to mesh as multiple QR codes into a single meshed message. Each QR code may include a direction locator to a memory storage instance or a URL at which the individualized safety message is stored. The individualized message may be kept at a unique URL or at a particular memory storage at the multi-layer QR messaging computer 337.

The multi-layer QR intelligent sign board 336 may be implemented for increased privacy of messages for instances when multiple vehicles approach the sign board from the same direction in the same timeframe. FIG. 3B shows that the first directional traveling vehicle 302, a second first direction traveling vehicle 342, and a third first direction traveling vehicle 352 are all traveling in the same direction (from the left-to-right on the overhead paper view) in a multi-lane roadway section. The multi-layer QR messaging computer 337 may communicate with individual vehicle messaging computers on the respective approaching vehicle and transmit a message to the respective oncoming vehicle which indicates in which of the layers of the multi-layer QR code the locator for the individualized message for the respective oncoming vehicle will be disposed. Specifically, the multi-layer QR messaging computer 337 may communicate with the messaging computer of the first direction traveling vehicle 302 and transmit a message that the personalized message for the first direction traveling vehicle 302 will be associated with the first layer QR code 3020. The multi-layer QR messaging computer 337 may communicate with the messaging computer of the second first direction traveling vehicle 342 and transmit a message that the personalized message for the second first direction traveling vehicle 342 will be associated with the second layer QR code 3420. The multi-layer QR messaging computer 337 may communicate with the messaging computer of the third direction traveling vehicle 352 and transmit a message that the personalized message for the third first direction traveling vehicle 352 will be associated with the third layer QR code 3520. Each of these messages that are transmitted to the respective computer of an oncoming vehicle may include an access code, with the access code indicating a respective layer of the multi-layer QR code.

The individual layers of the multi-layer QR code may be distinguished by various colors; however, for expediency with non-colored patent drawings the multi-layer QR code and the second and third layer QR codes 3420 and 3520 are shown with different hatchings instead of differently-colored squares.

After the code messages are transmitted to the vehicles, when the respective vehicle further approaches the multi-layer QR intelligent sign board 336 and the multi-layer QR screen 339 that is displaying a multi-layer QR code, a camera of the respective oncoming vehicle may capture the image of the multi-layer QR code and extract the appropriate layer therefrom based on the message/code received. The first direction traveling vehicle 302 may extract the first layer QR code 3020 from the multi-layer QR code. The second first direction traveling vehicle 342 may extract the second layer QR code 3420 from the multi-layer QR code. The third direction traveling vehicle 352 may extract the third layer QR code 3520 from the multi-layer QR code.

After having extracted the appropriate QR code, the respective oncoming vehicle may use the locator, that was indicated by the pattern of the respective individual QR code, to access an individualized message. The locator may direct to a unique URL which the messaging computer of the oncoming vehicle may access via a wireless internet connection. The locator may be to a unique data storage area at the multi-layer QR messaging computer 337 which may provide the data for the individualized message.

After the data for the individualized message is retrieved, the respective computer of the oncoming vehicle may use the data and generate an in-vehicle message display of the individualized message. For example, the computer of the first direction traveling vehicle 302 may generate a first vehicle in-vehicle display 30200 of "Beware of Pothole!". The computer of the second first direction traveling vehicle 342 may generate a second vehicle in-vehicle display 34200 of "Water Puddle in Your Lane, Slow Down!". The computer of the third first direction traveling vehicle 352 may generate a third vehicle in-vehicle display 35200 of "Beware of Carcass in your lane, Slow Down!" These various in-vehicle message displays may occur in a visual manner such as on the respective vehicle windshield, on a mounted personal mobile device in the vehicle, and/or in another navigational screen integrated in the dashboard of the respective oncoming vehicle. The individual messages may alternatively and/or additionally include an audio component for audio display of a message via a speaker of the vehicle and/or mobile device.

It should be appreciated that FIG. 1, FIG. 2A, FIG. 2B, FIG. 3A and FIG. 3B provide illustrations of some implementations and do not imply any limitations with regard to other embodiments in which the roadway messaging system and method may be implemented. Many modifications to the depicted environments, structures, and components may be made based on design and implementation requirements.

Referring to FIG. 4, an exemplary networked computer environment 400 in accordance with one embodiment is depicted and which may include the roadway messaging environment 100 that is depicted in FIG. 1 and other alternative roadway messaging environments such as with the bi-directional sign that is shown in FIG. 3. The networked computer environment 400 may include a computer 402 with a processor 404 and a data storage device 406 that is enabled to run a software program 408 and a roadway messaging program 410a. The networked computer environment 400 may also include a server 412 that is a computer and that is enabled to run a roadway messaging program 410b that may interact with a database 414 and a communication network 416. The server 412 may include a plurality of machine learning modules and/or may use the communication network 416 to access other servers which host machine learning models. The networked computer environment 400 may include a plurality of computers 402 and servers 412, although only one computer 402 and one server 412 are expressly shown in FIG. 2. The communication network 416 allowing communication between the computer 402 and the server 412 may include various types of communication networks, such as the Internet, a wide area network (WAN), a local area network (LAN), a telecommunication network, a wireless network, a public switched telephone network (PTSN) and/or a satellite network.

It should be appreciated that FIG. 4 provides only an illustration of one implementation and does not imply any limitations with regard to the environments in which different embodiments may be implemented. Many modifications to the depicted environments may be made based on design and implementation requirements.

The computer 402 may communicate with the server 412 via the communication network 416. Computers such as the vehicle messaging computer 103 of the first vehicle 102 within the roadway messaging environment 100 (and corresponding computers of the other vehicles) may also communicate with the client computer 402 and/or the server 412 via the communication network 416. The sign board messaging computer 107 and other roadside computers of the roadway messaging system may also communicate with the client computer 402 and/or the server 412 and with other computers in the roadway message environment 100 via the communication network 416. The communication network 416 may include connections such as wire, wireless communication links, and/or fiber optic cables.

Figure 6:
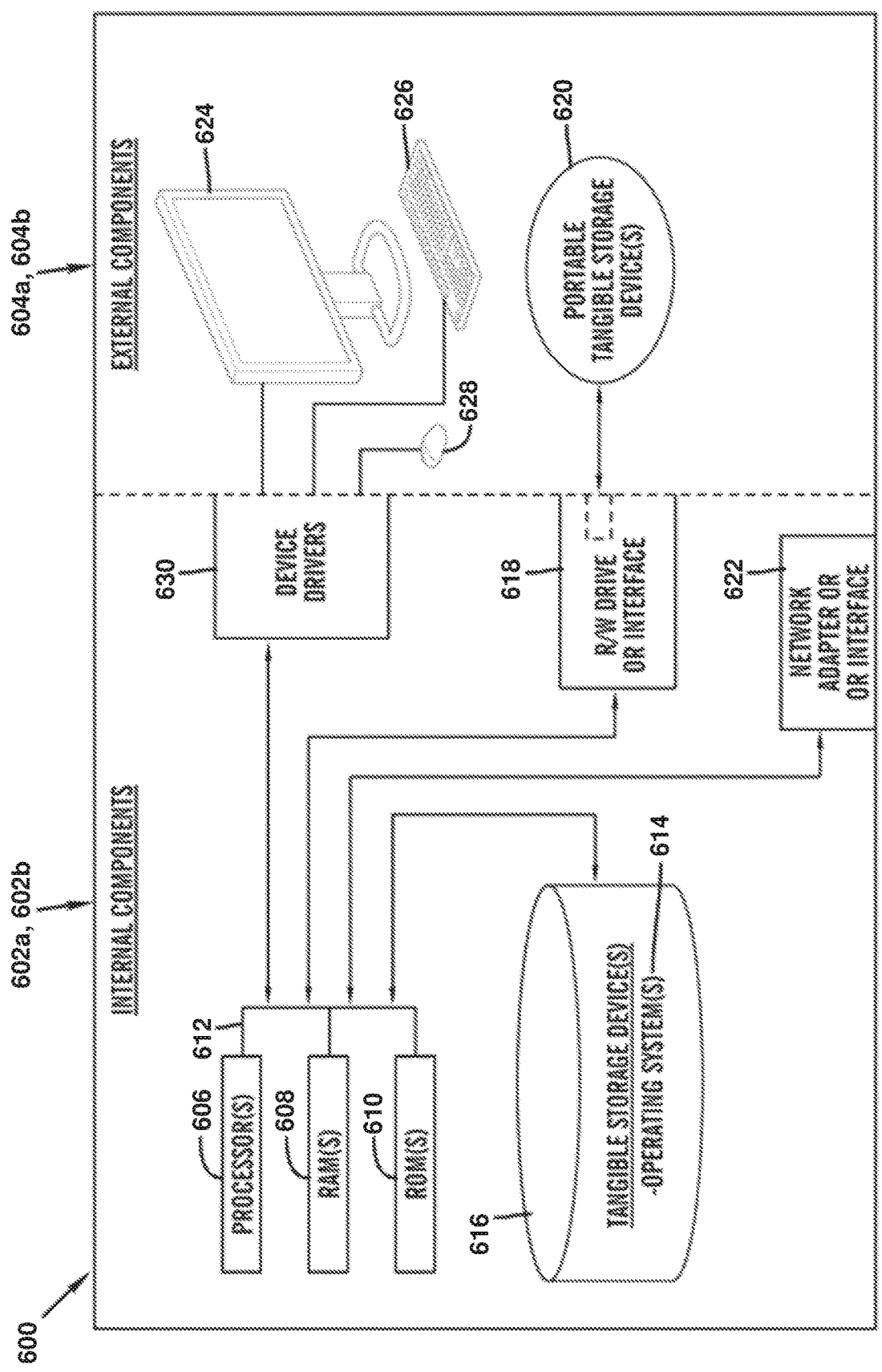
FIG. 6 is a block diagram of internal and external components of computers and servers depicted in FIGS. 1-4 according to at least one embodiment.

As will be discussed with reference to FIG. 6, the server 412 may include internal components 602a and external components 604a, respectively. The computer 402, the sign board messaging computer 107, the vehicle messaging computer 103 in the first vehicle 102, and any other computer in roadway messaging system may also each include internal components 602b and external components 604b as depicted in FIG. 6. Server 412 may also operate in a cloud computing service model, such as Software as a Service (SaaS), Platform as a Service (PaaS), or Infrastructure as a Service (IaaS). Server 412 may also be located in a cloud computing deployment model, such as a private cloud, community cloud, public cloud, or hybrid cloud. The computer 402 and the sign board messaging computer 107 may be, for example, a mobile device, a telephone, a personal digital assistant, a netbook, a laptop computer, a tablet computer, a desktop computer, or any type of computing devices capable of running a program, accessing a network, and accessing a database 414 in a server 412 that is remotely located with respect to the computer 402. The computer 402, the sign board messaging computer 107, the vehicle messaging computer 103 in the first vehicle 102, and any other computer in roadway messaging system may each include a display screen, a speaker, a microphone, a camera, and a keyboard or other input device for receiving output and providing input to the respective computer. According to various implementations of the present embodiment, the roadway messaging program 410a, 410b may interact with a database 414 that may be embedded in various storage devices, such as, but not limited to a various computers/mobile devices, a server 412 that may be in a network, or another cloud storage service. The sign board messaging computer 107 may also include an instance of the roadway messaging program for receiving data, analyzing the data via one or more machine learning models, and generating an individualized message, e.g., an individualized safety message, for an approaching vehicle.

The roadway messaging program 410a, 410b may be used to generate an individualized message for an oncoming vehicle based on useful information that is received by the sign board messaging computer 107. The roadway messaging program 410a, 410b may then transmit the individualized message to receiver components of computers that are at the display screen of the intelligent sign board 106 and/or on an approaching vehicle in order to cause a presentation of the individualized message to a person in the first vehicle 102 and/or for an autonomous vehicle to carry out a driving strategy based on the message. The presentation may occur visually and/or audibly and/or via a touch-based manner (e.g., in Braille on a computer device for a blind passenger riding in an autonomous vehicle).

The roadway messaging program 410a, 410b may also generate and transmit a message to another computer for review and/or approval of an administrator and/or manager of the roadway messaging environment 100, e.g., of a government road safety expert. In some embodiments, the roadway messaging program 410a, 410b may require approval from an administrator before authorizing a particular message or message-type to be displayed or transmitted for driving strategy execution which has not previously been completed and/or attempted at this roadway section. For example, a message generated at the sign board messaging computer 107 may be sent via the communication network 416 to a manager at the computer 402 for approval of the message. A machine learning model may determine whether the message constitutes a new or previously unused message or autonomous vehicle driving strategy that should be reviewed by a manager. If the machine learning model outputs that the message and/or driving strategy exceeds a threshold of uniqueness, the roadway messaging program 410a, 410b may in an automated manner generate and transmit a message to an administrator to request authorization to transmit the proposed message/driving instruction.

Figure 5:
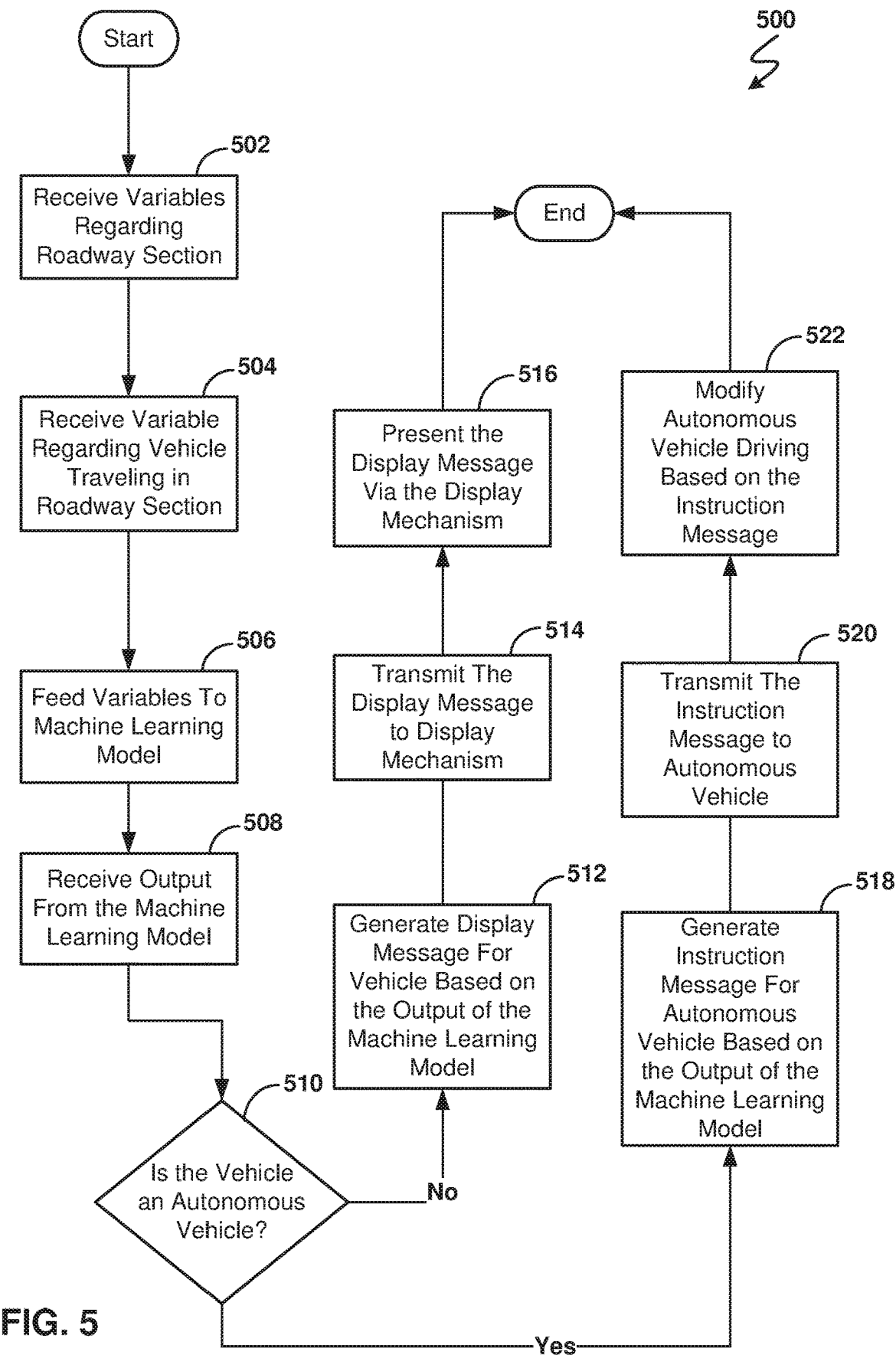
FIG. 5 is an operational flowchart illustrating a roadway messaging process according to at least one embodiment.

Referring now to FIG. 5, an operational flowchart depicts a roadway messaging process 500 that may, according to at least one embodiment, be performed using the roadway messaging program 410a, 410b and the various components shown in the roadway messaging environment 100 shown in FIG. 1. The roadway messaging program 410a, 410b may include various modules, user interfaces, and services, and may use data storage when the roadway messaging process 500 is performed.

In a step 502 of the roadway messaging process 500, variables regarding the roadway section are received. The variables may include one or some of those variables described for the useful information described herein. The reception may occur via the sign board messaging computer 107 receiving a data transmission via the communication network 416. The sign board messaging computer 107 may also be connected to or integrated with one or more sensors such as a camera, precipitation sensor, temperature sensor, etc. in order to identify variables pertaining to the roadway section. The sign board messaging computer 107 may include a global navigational signal responder which generates a global navigational signal which may be sensed by a respective global navigational signal receiver at other roadside computers, at the computer 402, and/or at the server 412. The sign board messaging computer 107 may include cameras and/or a passive and/or active sonar sensor to recognize the presence of vehicles and/or animals in the roadway section.

Some of this information may be received in step 502 by a user uploading the information into a computer such as the computer 402. The information may be uploaded at another computer and transmitted via the communication network 416 to the computer 402, to the sign board messaging computer 107, and/or to one of the multiple vehicles and/or sign boards in the roadway section.

These variables, e.g., this information or first information, that is received in step 502 may include those described previously with respect to FIGS. 2A and 2B regarding a blockage of a traffic lane.

In a step 504 of the roadway messaging process 500, one or more variables regarding a vehicle traveling in the roadway section are received. This roadway section may be the same roadway section for which other variables were received in step 502. These vehicle-related variables received in step 504 may be received by the sensors of the sign board messaging computer 107 sensing data and/or characteristics about an oncoming vehicle and/or by receiving a message transmission from a computer within the oncoming vehicle. Step 504 may also include a sensor such as a camera or a global navigational signal receiver, that is connected to or communicating with a roadside computer, identifying a position of the oncoming vehicles and a size of the oncoming vehicles.

In a step 506 of the roadway messaging process 500, the variables are fed to a machine learning model. These variables may include those variables that were received in steps 502 and in step 504. The machine learning model may be disposed within the sign board messaging computer 107 or within another computer that may communicate with the sign board messaging computer 107 via the communication network 416. An analytics engine in the sign board messaging computer 107 shown in FIG. 1 may be or may host the machine learning model to which variables are fed in step 506.

In a step 508 of the roadway messaging process 500, output from the machine learning model is received. This machine learning model which provides the output for step 508 is that machine learning model to which the variables were fed in step 506. The feeding of step 506 may trigger the generation of this output that is received in step 508. The machine learning model may be used to generate an individualized message that may include words, colors, symbols, and sounds and that may include a driving instruction/recommendation. The driving instruction/recommendation may be shown or may be transmitted to an autonomous vehicle and may cause the autonomous vehicle to implement the recommended driving strategy. The machine learning model may be trained with supervised training which inputs variables related to traffic and for which driving suggestions are provided. For example, if temperatures are lower than freezing and precipitation is on the ground, the message may warn vehicles to slow down or may command an autonomous vehicle to slow down. A human driver may see this displayed message and follow the suggestion. An autonomous vehicle may receive this recommendation/instruction and implement the instruction, e.g., by slowing down to a safer speed. The machine learning model may be disposed in the sign board messaging computer 107, in the roadway messaging program 410a of the computer 402, in the roadway messaging program 410b of the server 412, and/or in another computer or server in another location that is accessible via the communication network 416.

In a step 510 of the roadway messaging process 500, a determination is made whether the approaching vehicle is an autonomous vehicle. The vehicle that is analyzed in step 510 may be that vehicle about which variables were received in step 504, e.g., the first vehicle 102 shown in FIG. 1, the wide vehicle 202 shown in FIG. 2A, the narrow vehicle 232 shown in FIG. 2B, the first direction traveling vehicle 302 shown in FIG. 3, and the second direction traveling vehicle 324 shown in FIG. 3. If the determination is affirmative and the approaching vehicle is autonomous, the roadway messaging process 500 proceeds to step 518 after step 510. If the determination is negative and the approaching vehicle is not autonomous, the roadway messaging process 500 proceeds to step 512 after step 510. The determination of step 510 may be performed via the sign board messaging computer 107 and may be based on information sensed via one or more sensors of the sign board messaging computer 107. The determination of step 510 may also be based on incoming message transmissions from one or more computers of the approaching vehicle. These incoming message transmissions may indicate whether the approaching vehicle which generated the message is autonomous. In one embodiment, an autonomous vehicle may be sensed if a camera connected to or communicating with the sign board messaging computer 107 captures video or images which indicate that an oncoming vehicle does not have an occupant sitting in the usual driver position.

In a step 512 of the roadway messaging process 500 which occurs in the branch for a non-autonomous vehicle, a display message is generated for the vehicle. The display message that is generated in step 512 is based on the output of the machine learning model. This output may be that output that was received in step 508. The sign board messaging computer 107 and its instance of the roadway messaging program may perform this display message generation of step 512.

In a step 514 of the roadway messaging process 500 which is part of the process branch for the non-autonomous vehicle, the display message is transmitted to a display mechanism. This display message may be that message that was generated in step 512. The display mechanism may include a display screen of the intelligent sign board 106 shown in FIG. 1. The intelligent sign board 106 may be a stationary signboard disposed in the vicinity of the roadway section. The display mechanism may be for a display device that is within the approaching vehicle, e.g., within the first vehicle 102.

In a step 516 of the roadway messaging process 500 which is part of the process branch for the non-autonomous vehicle, the display message is presented via the display mechanism. This message may be that message that was generated in step 512 and transmitted in step 514. This display mechanism may be the display mechanism that received the transmitted display message in step 514, whether part of the intelligent sign board 106 or part of an in-vehicle display.

This presenting of step 516 may occur by displaying the message on glass of the first vehicle 102 in a field of view of an occupant of the first vehicle 102. The display may occur on a front windshield of the first vehicle 102 so as to be visible by the driver without requiring the driver to dangerously change their viewpoint.

This presenting of step 516 may occur by displaying the message on the intelligent sign board 106 by the roadway section 104.

With respect to the bi-directional message display that was shown in FIG. 3, the branch of steps 502, 504, 506, 508, 510, 512, 514, 516, and 518 may also simultaneously be performed for a vehicle that is traveling in the opposite direction. This simultaneous performance may include determining, via the sign board messaging computer 107, a further variable regarding a second vehicle traveling along the roadway section. The sign board messaging computer 107 may generate a second message based on the first variable and on the further variable. This sign board may achieve this bi-directional message effect by the sign board implementing a first holographic view for the first message and a second holographic view for the second message. Vehicle occupants traveling in the first direction may, due to the angles of light, see the first holographic effect but not the second holographic effect. Vehicle occupants traveling in the second direction may, due to the angles of light, see the second holographic effect but not the first holographic effect.

In a step 518 of the roadway messaging process 500 which occurs as part of the autonomous vehicle branch of the roadway messaging process 500 after the branch split at step 510, an instruction message for an autonomous vehicle is generated based on the output of the machine learning model. This output that is the basis for the generation of the instruction message in step 518 may be the output that was received in step 508. The sign board messaging computer 107 may generate this instruction message. The sign board messaging computer 107 and its instance of the roadway messaging program may perform this instruction message generation of step 518.

In a step 520 of the roadway messaging process 500 which occurs as part of the autonomous vehicle branch of the roadway messaging process 500 after the branch split at step 510, the instruction message is transmitted to the autonomous vehicle. This autonomous vehicle may be that vehicle from which one or more variables were received in step 504. This transmission of step 520 may occur via the communication network 416 and may occur from the sign board messaging computer 107 to a computer of the oncoming autonomous vehicle. If the first vehicle 102 is an autonomous vehicle, the transmission of step 520 may occur from the sign board messaging computer 107, through the communication network 416, and to a computer, such as the vehicle messaging computer 103, of the first vehicle 102.

In a step 522 of the roadway messaging process 500 which occurs as part of the autonomous vehicle branch of the roadway messaging process 500 after the branch split at step 510, driving of the autonomous vehicle is modified based on the instruction message. This instruction message may be that message which was generated in step 518 and transmitted in step 520. A computer of the autonomous vehicle may control components of the autonomous vehicle to implement the modification. For example, if the instruction is to reduce speed then a signal may be sent to the drive components so that less fuel is sent to the engine, so that the engine performs a reduction of strokes, and so that the brakes are applied to the wheels.

Any machine learning model used for various steps of the roadway messaging process 500 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The one or more machine learning models may be trained. The process of training a machine learning model may include providing training data to a learning algorithm or to a machine learning algorithm. The machine learning model is the model structure or system that is created by the training process. The training data should include targets or target attributes which include a correct answer. Training data for the present embodiments may include similar information for other warehouses and/or facilities and appropriate track plans and tracks that were generated for transporting goods in those other warehouses. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns that are identified to determine what the target is for new data without a given answer. Training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the sign board messaging computer 107, at the computer 402, and/or at another computer associated with the server 412. The machine learning model that is generated may be stored in an analytics engine on the sign board messaging computer 107, on the computer 402, and/or on the server 412 or on another external server accessible to the computer 402 and to the server 412 via the communication network 416. The automated design of the display message and/or driving modification may be performed via a machine learning model on the device or in the cloud. Using a machine learning model on the device, e.g., on the sign board messaging computer 107, helps reduce data transmission required between the sign board messaging computer 107, the vehicle computers, and a server in the cloud. Such a mobile machine learning model may be performed using inference-based machine learning models such as TensorFlow® Lite (TensorFlow® and all TensorFlow®—based trademarks and logos are trademarks or registered trademarks of Google, Inc. and/or its affiliates).

The roadway messaging process 500 may be implemented for a roadway section 104 in which multiple vehicles are approaching. The generating of the message and/or of the driving instruction may account for the location and paths of other vehicles in and/or approaching the roadway section.

In some embodiments, a message generation may occur on the basis of the sign board messaging computer 107 sensing that some accident and/or change in nature has occurred in the roadway section ahead. The sign board messaging computer 107 may receive such information from one of its sensors, from a transmission from another roadway computer and/or sensor, from vehicles in the vicinity, and from other computers in the cloud. The message and/or driving instruction that is generated may indicate a driving strategy to safely maneuver or avoid the accident and/or change in nature. The roadway messaging process 500 may be invoked in this instance to help avoid additional traffic accidents.

In at least some of the present embodiments the roadway messaging system may be an integrated system which incorporates historical data, a data analytics engine, vehicle information, driver attributes and information, and IoT (Internet-of-Things) sensors that collect real time information about road conditions, vehicle conditions, etc. The roadway messaging system may process all of the gathered information and analyze the gathered information in order to generate personalized safety messages for oncoming vehicles. The safety message by itself or supplemented by at least some of the received information may be displayed with sign boards to display helpful messages to drivers so that the drivers may perform real time intuitive visualization. The information may be used to suggest to a driver to focus attention. The information may be used to implement real-time adoption by autonomous vehicles to cause a temporary takeover of the decision making of the autonomous vehicle. The roadway messaging system may include an IoT integrated system that is fed information from various platforms such as a weather system, road condition platform, traffic condition platform, and autonomous vehicles. The roadway messaging system may generate contextual insightful information that is displayed on any digital boards, billboards, and/or sign boards to provide more near real-time information about the roadway section. Such an intelligent sign board provides advantages over sign boards which have static signs or which display static messages for all vehicles without individualizing the messages.

As described previously, the roadway messaging system may additionally implement the contextual safety message as an instruction message which may be accessible to and received by an autonomous vehicle and which causes the autonomous vehicle to update its vehicle driving decision. For example, based on the situation of a particular road condition information received via IoT sensors the roadway messaging system may derive that there is oil spilled on road and that a fast moving vehicle may have trouble in the oil or may experience an accident in the oil. Based on this determination from a single computer or from a series of computers, an intelligent sign board disposed some distance before the oil spill, e.g., 1 kilometer before the oil spill, may display signs which warn fast-moving vehicles to slow down their overall vehicular speed and their speed relative to other vehicles in the vicinity. For autonomous vehicles which are approaching the oil spill, the roadway messaging system may cause an instruction message to be sent to the autonomous vehicle which causes the autonomous vehicle to have a substantially reduced speed or to stop by the time the autonomous vehicle reaches the oil spill. The instruction message may include a distance of the current autonomous vehicle position to the beginning of the oil spill and/or an amount of time until the autonomous vehicle would reach the beginning of the oil spill when maintaining its current speed. Thus, the roadway messaging system may help drivers and vehicles to proceed to more carefully in a controlled fashion which helps avoid accidents.

In at least some of the embodiments, driving and road situations may be recognized as being dangerous or potentially dangerous by the roadway messaging program. Intelligent sign boards and messaging to in-vehicle message displays may be updated sufficiently frequently to provide an individualized safety suggestion for each vehicle based on ascertained risks. In some embodiments, safety suggestions may also be generated based on a category or type of each vehicle which may be determined by the roadway messaging program.

In at least some embodiments, the individualized safety messages may include symbols and graphics in addition to the textual word messages. The safety messages may include visuals which include words and/or a combination of words, colors, graphics, and/or symbols.

The safety messages that are generated by the roadway messaging program may be organized and presented in a manner which catches the attention of an occupant of an oncoming vehicle.

For generating the messages, the roadway messaging program may implement a digital twin real time simulation by using real time data and different influential attributes of the real time situation. The digital twin simulation processes the data, creates a digital model of each approaching vehicle, uses each digital model to simulate what will happen for each vehicle as the vehicle passes through the roadway section, and creates the real time safety recommendation based on user preferences, on the vehicle need, and on the simulated real-time digital model. The digital model for each vehicle may be continually updated based on new information received and/or sensed by the various devices in the system which communicate with each other. The safety recommendation that is generated is used to generate and use an individualized message for each vehicle. The digital twin models may be hosted on an instance of the roadway messaging program hosted by the sign board messaging computer 107 and/or in another instance of the roadway messaging program that is hosted in the cloud.

Each vehicle may have occupant and/or driver preferences stored in the vehicle messaging computer which may notify the roadway messaging computer so that some messages may be tailored based on user preferences of the occupants. For example, such user preferences may include a language preference whereby one user prefers to receive word messages in the Spanish language. After receiving this information, the roadway messaging program may generate an individualized message in the Spanish language that is presented to that vehicle, e.g., is displayed in the Spanish language on the intelligent sign board and/or is displayed in the Spanish language on an in-vehicle display.

Each computer component that is part of the roadway messaging system or that communicates with the roadway messaging system may transmit its sensed data to cloud infrastructure to enable access by the other computer components. This pooling of data may allow the individual roadway messaging system computers to generate more effective safety recommendations for oncoming vehicles. The roadway messaging computers may make use of the large amounts of information to generate individualized safety messages for display in a sequence so that the messages will be appropriately seen as particular oncoming vehicles pass a sign board. This information helps a correct message sequence be generated and to avoid a problem of displaying a safety message for an unintended vehicle.

The roadway messaging system may also take into account a time of day and a lighting factor as a variable for generating safety recommendations. In some instances as the daytime comes to an end and the sun sets, the safety recommendations may include a warning for individual vehicles to turn on their headlights.

The roadway messaging system may also incorporate historical data about the particular roadway section, about the oncoming vehicle, and about the type of the oncoming vehicle as variables for generating the individualized message. If the historical data indicates that vehicles of a first type have had troubles in the approaching roadway section, this information may be weighted and used to generate a safety recommendation for an approaching vehicle that also is of the first type. For example, in a roadway condition with slick roads a "slow down" safety message may be generated for a rear-wheel drive vehicle which is driving without sufficient weight on its back seat/back vehicle portion.

The present embodiments may be applied for a physical roadway disposed on the ground of the earth and with vehicles which include wheels.

It may be appreciated that FIG. 5 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

FIG. 6 is a block diagram 600 of internal and external components of computers depicted in FIGS. 1-4 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602a, 602b, 604a, 604b is representative of any electronic device capable of executing machine-readable program instructions. Data processing system 602a, 602b, 604a, 604b may be representative of a smart phone, a computer system, PDA, or other electronic devices. Examples of computing systems, environments, and/or configurations that may represented by data processing system 602a, 602b, 604a, 604b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer 402, the server 412, the sign board messaging computer 107, and any other computer of the various components in the roadway messaging environment 100 may include respective sets of internal components 602a, 602b and/or external components 604a, 604b illustrated in FIG. 6. Each of the sets of internal components 602a, 602b includes one or more processors 606, one or more computer-readable RAMs 608 and one or more computer-readable ROMs 610 on one or more buses 612, and one or more operating systems 614 and one or more computer-readable tangible storage devices 616. The one or more operating systems 614, the software program 408 in the computer 402, the roadway messaging program 410a in the computer 402, and the roadway messaging program 410b in server 412 may be stored on one or more computer-readable tangible storage devices 616 for execution by one or more processors 606 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory, or any other computer-readable tangible storage device that can store a computer program and digital information.

Each set of internal components 602a, 602b also includes a R/W drive or interface 618 to read from and write to one or more portable computer-readable tangible storage devices 620 such as a CD-ROM, DVD, memory stick, magnetic tape, magnetic disk, optical disk or semiconductor storage device. A software program, such as the software program 408 and the roadway messaging program 410a, 410b can be stored on one or more of the respective portable computer-readable tangible storage devices 620, read via the respective RAY drive or interface 618 and loaded into the respective hard drive, e.g., the tangible storage device 616.

Each set of internal components 602a, 602b may also include network adapters (or switch port cards) or interfaces 622 such as a TCP/IP adapter cards, wireless wi-fi interface cards, or 3G, 4G, or 5G wireless interface cards or other wired or wireless communication links. The software program 408, the roadway messaging program 410a in the computer 402 and/or in the sign board messaging computer 107 and the roadway messaging program 410b in the server 412 can be downloaded from an external computer (e.g., server) via a network (for example, the Internet, a local area network or other, wide area network) and respective network adapters or interfaces 622. From the network adapters (or switch port adaptors) or interfaces 622, the software program 408 and the roadway messaging program 410a in the computer 402 and the roadway messaging program 410b in server 412 are loaded into the respective hard drive, e.g., the tangible storage device 616. The network may include copper wires, optical fibers, wireless transmission, routers, firewalls, switches, gateway computers and/or edge servers.

Each of the sets of external components 604a, 604b can include a computer display monitor 624, a keyboard 626, and a computer mouse 628. External components 604a, 604b can also include touch screens, virtual keyboards, touch pads, pointing devices, and other human interface devices. Each of the sets of internal components 602a, 602b also includes device drivers 630 to interface to computer display monitor 624, keyboard 626, and computer mouse 628. The device drivers 630, R/W drive or interface 618 and network adapter or interface 622 include hardware and software (stored in storage device 616 and/or ROM 610).

The present invention may be a system, a method, and/or a computer program product at any possible technical detail level of integration. The computer program product may include a computer readable storage medium (or media) having computer readable program instructions thereon for causing a processor to carry out aspects of the present invention The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
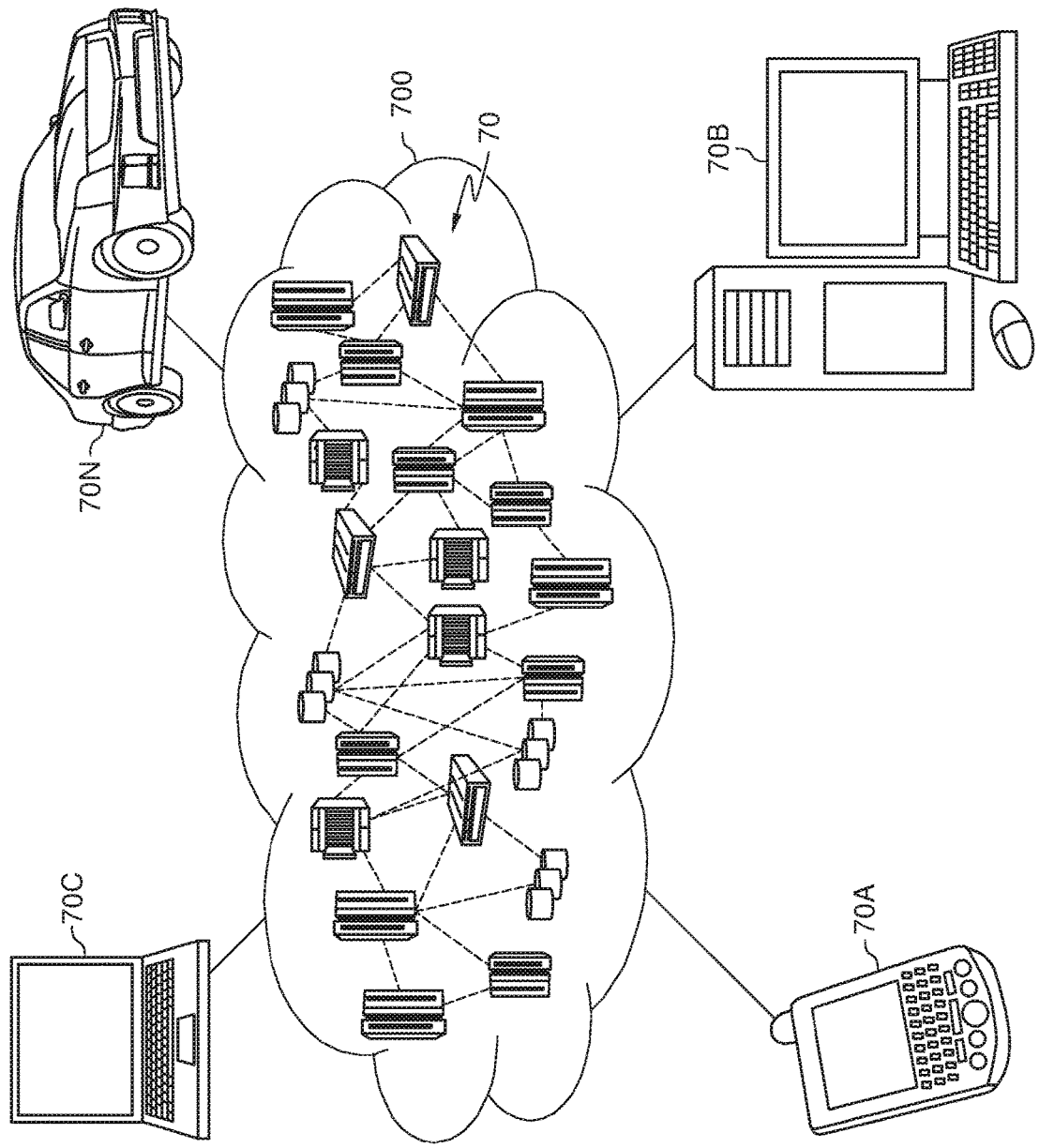
FIG. 7 is a block diagram of an illustrative cloud computing environment including the computers depicted in FIGS. 1-4 in accordance with an embodiment of the present disclosure.

Referring now to FIG. 7, illustrative cloud computing environment 700 is depicted. As shown, cloud computing environment 700 comprises one or more cloud computing nodes 70 with which local computing devices used by cloud consumers, such as, for example, personal digital assistant (PDA) or cellular telephone 70A, desktop computer 70B, laptop computer 70C, and/or automobile computer system 70N may communicate. Nodes 70 may communicate with one another and may include roadside signboards, roadside computers, and/or vehicle computers such as those shown in FIGS. 1-4. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 70A-N shown in FIG. 7 are intended to be illustrative only and that computing nodes 70 and cloud computing environment 700 can communicate with any type of computerized device over any type of network and/or network addressable connection (e.g., using a web browser).

Figure 8:
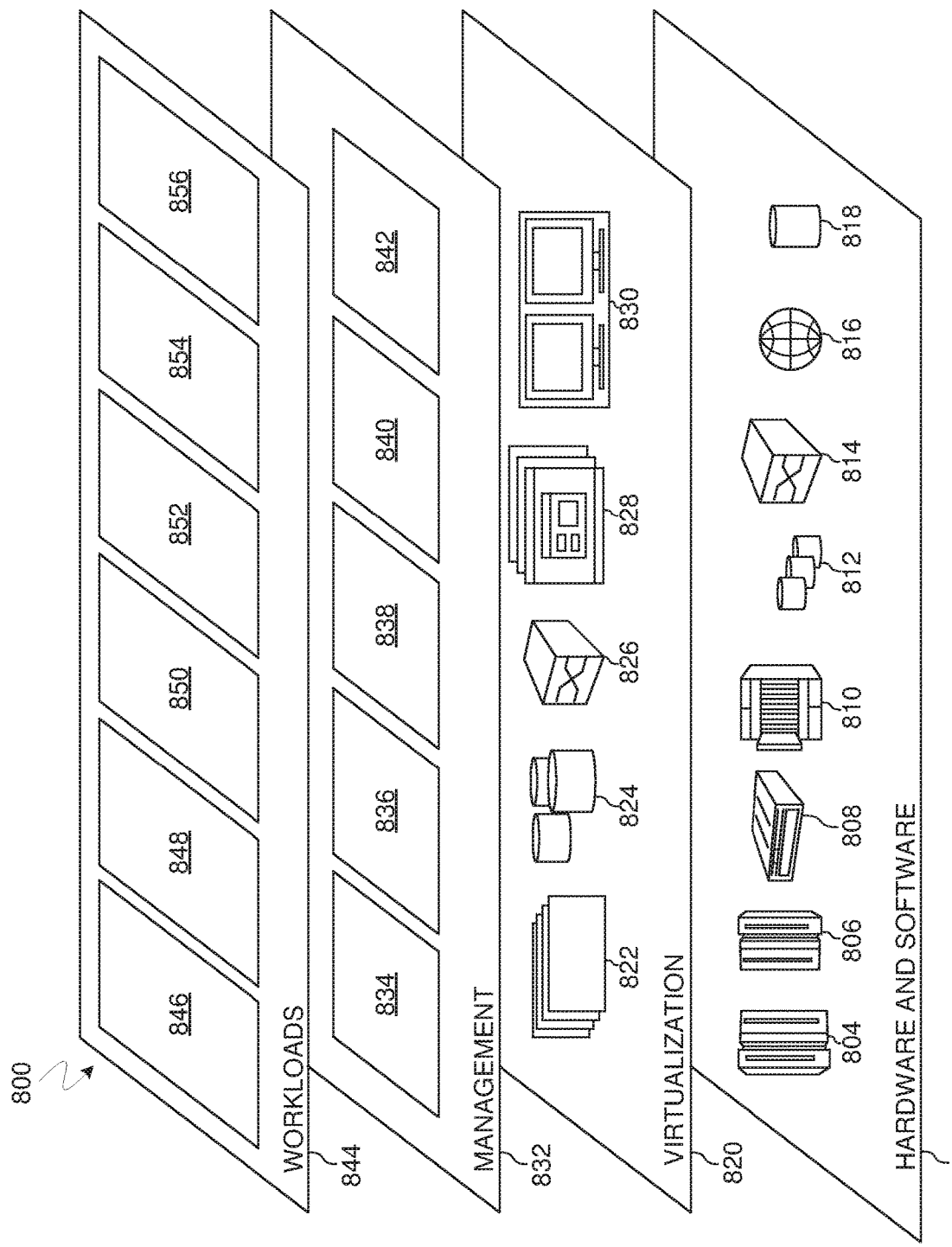
FIG. 8 is a block diagram of functional layers of the illustrative cloud computing environment of FIG. 7, in accordance with an embodiment of the present disclosure.

Referring now to FIG. 8, a set of functional abstraction layers 800 provided by cloud computing environment 700 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components. Examples of hardware components include: mainframes 804; RISC (Reduced Instruction Set Computer) architecture based servers 806; servers 808; blade servers 810; storage devices 812; and networks and networking components 814. In some embodiments, software components include network application server software 816 and database software 818.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 832 may provide the functions described below. Resource provisioning 834 provides dynamic procurement of computing resources and other resources that are utilized to perform tasks within the cloud computing environment. Metering and Pricing 836 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provide pre-arrangement for, and procurement of, cloud computing resources for which a future requirement is anticipated in accordance with an SLA.

Workloads layer 844 provides examples of functionality for which the cloud computing environment may be utilized. Examples of workloads and functions which may be provided from this layer include: mapping and navigation 846; software development and lifecycle management 848; virtual classroom education delivery 850; data analytics processing 852; transaction processing 854; and roadway messaging 856. A roadway messaging program 410a, 410b provides a way to dynamically generate and provide individualized messages to vehicles who are traveling down a roadway which might have one or more safety hazards.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for roadway messaging, the method comprising:
    receiving, via a computer, first information of a condition of a roadway section;
    determining, via the computer, a variable of a first vehicle;
    comparing, via the computer, the variable of the first vehicle to the condition of the roadway section;
    generating, via the computer, a first message based on the comparison, the first message comprising a driving recommendation for the first vehicle;
    transmitting, via the computer, the first message for reception by the first vehicle;
    determining, via the computer, a variable regarding a second vehicle traveling in a second direction that is opposite to a first direction in which the first vehicle is traveling;
    generating, via the computer, a second message based on the variable; and
    presenting the second message on a first side of a roadway sign board so as to be directed and visible to the second vehicle, wherein the transmitting of the first message comprises presenting the first message also on the first side of the sign board so as to be directed and visible to the first vehicle that is traveling in the first direction, wherein the first and the second messages are presented simultaneously on the first side of the sign board, and wherein the sign board implements a first holographic view for the first message and a second holographic view for the second message.

2. The method of claim 1, wherein the condition of the roadway section comprises a reduction of the roadway section.

3. The method of claim 2, further comprising determining via the computer a passable road width at the reduction in the roadway section, wherein the passable road width covers space only of one or more original lanes of the roadway section.

4. The method of claim 2, further comprising determining via the computer a passable road width at the reduction in the roadway section, wherein the passable road width covers space of at least one original lane of the roadway section and a road shoulder that is adjacent to the roadway section.

5. The method of claim 4, further comprising:
receiving, via the computer, further information regarding a quality of the road shoulder;
receiving, via the computer, additional information regarding drivability of the first vehicle on the road shoulder;
wherein the determining whether the first vehicle fits through the passable road width takes into account the quality of the road shoulder and the drivability of the first vehicle on the road shoulder.

6. The method of claim 5, wherein the additional information regarding the drivability of the first vehicle on the road shoulder comprises at least one member selected from a group consisting of tire conditions of the first vehicle and ground clearance of the first vehicle.

7. A computer system for roadway messaging, the computer system comprising:
one or more processors, one or more computer-readable memories, and program instructions stored on at least one of the one or more computer-readable memories for execution by at least one of the one or more processors to cause the computer system to:
receive first information of a condition of a roadway section;
determine a variable of a first vehicle;
compare the variable of the first vehicle to the condition of the roadway section;
generate a first message based on the comparison, the first message comprising a driving recommendation for the first vehicle;
transmit the first message for reception by the first vehicle;
determine a second variable regarding a second vehicle traveling towards the roadway section;
generate a second message based on the second variable; and
generate a multi-layer QR code comprising a first QR layer associated with the first message and a second QR layer associated with the second message.

8. The computer system of claim 7, wherein the program instructions are for further execution to cause the computer system to:
display the multi-layer QR code on a roadway sign;
transmit a first access code associated with the first QR layer to the first vehicle;
transmit a second access code associated with the second QR layer to the second vehicle;
wherein the first QR layer directs to a first locator pointing to a first location for accessing the first message;
wherein the second QR layer directs to a second locator pointing to a second location for accessing the second message; and
wherein the first message and the second message are accessible from the first location and the second location, respectively, for retrieval for a respective in-vehicle presentation of the first or the second message.

9. The computer system of claim 7, wherein the condition of the roadway section relates to an obstacle within the roadway section and a passable road width around the obstacle covers space only of one or more original lanes of the roadway section.

10. The computer system of claim 7, wherein the condition of the roadway section relates to an obstacle within the roadway section and a passable road width around the obstacle covers space of at least one original lane of the roadway section and a road shoulder that is adjacent to the roadway section.

11. The computer system of claim 10, wherein the program instructions are for further execution to cause the computer system to:
receive further information regarding a quality of the road shoulder; and
receive additional information regarding drivability of the first vehicle on the road shoulder;
wherein the comparison of the variable of the first vehicle to the condition of the roadway section comprises determining whether the first vehicle fits through the passable road width and takes into account the quality of the road shoulder and the drivability of the first vehicle on the road shoulder.

12. A computer program product for roadway messaging, the computer program product comprising a computer-readable storage medium having program instructions embodied therewith, wherein the program instructions are executable by a computer system to cause the computer system to:
receive first information of a reduction of a roadway section;
determine a passable road width at the reduction in the roadway section, wherein the passable road width covers space of at least one original lane of the roadway section and a road shoulder that is adjacent to the roadway section;
determine a size of a first vehicle;
determine whether the first vehicle fits through the passable road width;
generate a first message based on the determining of whether the first vehicle fits through the passable road width, the first message comprising a driving recommendation for the first vehicle;
transmit the first message for reception by the first vehicle;
receive further information regarding a quality of the road shoulder; and
receive additional information regarding drivability of the first vehicle on the road shoulder;
wherein the determining whether the first vehicle fits through the passable road width takes into account the quality of the road shoulder and the drivability of the first vehicle on the road shoulder.

13. The computer program product of claim 12, wherein the additional information regarding the drivability of the first vehicle on the road shoulder comprises at least one member selected from a group consisting of tire conditions of the first vehicle and ground clearance of the first vehicle.

14. The computer program product of claim 12, wherein the transmitting of the first message occurs via at least one member selected from a group consisting of a roadway sign board presentation, reception by the first vehicle for an in-vehicle display of the first message, and reception by the first vehicle for automated implementation of a driving strategy based on the first message.

15. The computer program product of claim 12, wherein the program instructions are for further execution to cause the computer system to:
determine a variable regarding a second vehicle traveling in a second direction that is opposite to a first direction in which the first vehicle is traveling;
generate a second message based on the variable; and
presenting the second message on a roadway sign board so as to be visible to the second vehicle;

wherein the transmitting of the first message comprises presenting the first message on the sign board so as to be visible by the first vehicle that is traveling in the first direction.

16. The computer program product of claim 15, wherein the sign board implements a first holographic view for the first message and a second holographic view for the second message.

17. The computer program product of claim 12, wherein the program instructions are for further execution to cause the computer system to:

determine a variable regarding a second vehicle traveling in a first direction in which the first vehicle is traveling;
generate a second message based on the variable; and
generate a multi-layer QR code comprising a first QR layer associated with the first message and a second QR layer associated with the second message.

18. The computer program product of claim 17, wherein the program instructions are for further execution to cause the computer system to:

display the multi-layer QR code on a roadway sign;
transmit a first access code associated with the first QR layer to the first vehicle; and
transmit a second access code associated with the second QR layer to the second vehicle;
wherein the first QR layer directs to a first locator pointing to a first location for accessing the first message;
wherein the second QR layer directs to a second locator pointing to a second location for accessing the second message; and
wherein the first message and the second message are accessible from the first location and the second location, respectively, for retrieval for a respective in-vehicle presentation of the first or the second message.

19. The computer system of claim 11, wherein the additional information regarding the drivability of the first vehicle on the road shoulder comprises at least one member selected from a group consisting of tire conditions of the first vehicle and ground clearance of the first vehicle.

* * * * *